US008998423B2

(12) United States Patent
Sawai

(10) Patent No.: US 8,998,423 B2
(45) Date of Patent: Apr. 7, 2015

(54) IMAGE PROJECTION APPARATUS

(75) Inventor: Yasumasa Sawai, Yamatotakada (JP)

(73) Assignee: Konica Minolta CPTO, Inc., Tokyo (JP)

( * ) Notice: Subject to any disclaimer, the term of this patent is extended or adjusted under 35 U.S.C. 154(b) by 770 days.

(21) Appl. No.: 13/338,133

(22) Filed: Dec. 27, 2011

(65) Prior Publication Data

US 2012/0162615 A1 Jun. 28, 2012

(30) Foreign Application Priority Data

Dec. 24, 2010 (JP) ................................ 2010-287340

(51) Int. Cl.
*G03B 21/00* (2006.01)
*G02B 26/08* (2006.01)
*G03B 33/12* (2006.01)
*H04N 9/31* (2006.01)
*G02B 27/00* (2006.01)
*G02B 27/09* (2006.01)

(52) U.S. Cl.
CPC .......... *G03B 21/008* (2013.01); *G02B 26/0833* (2013.01); *G02B 27/0927* (2013.01); *G02B 27/0994* (2013.01); *G03B 33/12* (2013.01); *H04N 9/3152* (2013.01); *H04N 9/3161* (2013.01); *G02B 27/0018* (2013.01)

(58) Field of Classification Search
CPC ........... G03B 21/2013; G03B 21/2073; G03B 21/2066; G03B 33/06
USPC ...................................................... 353/31, 30
See application file for complete search history.

(56) References Cited

U.S. PATENT DOCUMENTS

2008/0018981 A1 * 1/2008 Jain et al. ...................... 359/290

FOREIGN PATENT DOCUMENTS

JP 2010-44272 2/2010

OTHER PUBLICATIONS

D.S. Dewald, "Invited Paper: Advances in Contrast Enhancement for DLP Projection Displays", SID Symposium Digest of Technical Papers, pp. 1246-1249, May 2002, vol. 33, Issue 1.

* cited by examiner

*Primary Examiner* — William C Dowling
*Assistant Examiner* — Jerry Brooks
(74) *Attorney, Agent, or Firm* — Cozen O'Connor

(57) ABSTRACT

Assuming that a normal line of an image display surface of a DMD is a normal line Ax of the image display surface, that a direction in which a light beam specularly reflected by a mirror is outputted is a specular reflection direction R, and that an angle that the specular reflection direction R forms with respect to the normal line Ax of the image display surface is denoted by γ, an image projection apparatus satisfies the following conditional expression: $\beta_{(2\cdot k-1)} \geq 2\cdot\gamma - \beta_{(2\cdot k)} \geq \beta_{(2\cdot k+1)}$, where $\beta_{(2\cdot k-1)}$ and $\beta_{(2\cdot k+1)}$ represent a diffraction angle of an odd-order diffracted light, and $\beta_{(2\cdot k)}$ represents a diffraction angle of an even-order diffracted light.

7 Claims, 13 Drawing Sheets

AX
R
γ
44
S
D
α
θ
β
L
44a
44b 1
2
44
52
7
53
63
55c
55
58
56
56a
56b
54
55a
55b
51
24

IMAGE PROJECTION APPARATUS

This application is based on Japanese Patent Application No. 2010-287340 filed on Dec. 24, 2010, the contents of which are hereby incorporated by reference.

BACKGROUND OF THE INVENTION

1. Field of the Invention

The present invention is related to an image projection apparatus which projects an image formed on a display device onto a screen, and the present invention is specifically related to an image projection apparatus that is provided with a display device based on a digital micromirror device which displays an image by turning mirrors that function as pixels.

2. Description of Related Art

A digital micromirror device (hereinafter referred to as a DMD, a product by Texas Instruments Incorporated in USA) has a plurality of micromirrors arranged in a matrix. The tilt angles of the micromirrors are controlled in a binary ON/OFF manner, and by controlling the tilt of the mirrors, it is possible to modulate light incident on the digital micromirror device. Since the DMD has the configuration in which a plurality of mirrors whose tilt angles are variable are densely arranged two-dimensionally, the surface of the DMD includes unevenness resulting from the surfaces of the individual mirrors, and this unevenness functions as a blazed diffraction grating.

A related technology has been proposed to reduce effects of diffraction in the DMD. The related technology proposes a laser processing apparatus that irradiates the mirrors of a DMD with light from a laser light source and diffraction light which is reflected from the mirrors of the DMD is focused on a target to be processed via a condenser lens and an objective lens. In this laser processing apparatus, the DMD is tilted at a predetermined angle so that a light beam that has been reflected on the mirrors is not split into two by diffraction, to thereby enable the light beam that has been reflected on the mirrors to be efficiently transmitted to the target to be processed (see JP-A-2010-44272).

In the laser processing apparatus of the related technology mentioned above, degradation of light transmission efficiency due to diffraction is avoided by tilting the DMD by a predetermined angle (in an example, by 5°) with respect to the optical axis of the objective lens. However, the configuration of this apparatus is not applicable to an image projection apparatus such as a projector. It is true that DMDs are widely used as display devices in image projection apparatuses, but if a DMD is tilted as much as by 5° with respect to the optical axis of a projection lens, blurring occurs in, for example, the periphery of a projected image.

In an image projection apparatus, illumination light is reflected in a state in which the mirror-pixels of the DMD are tilted by a predetermined angle, and thereby, ON-light is outputted as image light in a direction perpendicular to an image display surface of the DMD. On the other hand, illumination light is reflected in a state in which the mirrors are tilted by an angle different from the angle by which they are tilted for the ON-light, and thereby, light that is not necessary for projection is outputted as OFF-light. The ON-light is guided to a screen via a projection lens, but the OFF-light does not enter the projection lens and does not reach the screen. By controlling the tilt of the mirrors in the binary ON/OFF manner in this way, it is possible to display an image on the DMD and project the image onto a screen. However, as described above, due to characteristics of the DMD as a diffraction grating, the OFF-light reflected by the mirrors is outputted by being dispersed according to the diffraction orders, and part of the dispersed light enters the projection lens, which may disadvantageously degrade the contrast of an image that is projected on the screen. The ON-light is also outputted by being dispersed according to the diffraction orders, and part of the dispersed light does not enter the projection lens, which may disadvantageously degrade the brightness of the image that is projected on the screen.

To cope with this, there has been proposed a related technology for preventing the degradation of the brightness of an image projected on the screen. According to the related technology, a pupil of the projection lens is formed to be oval-shaped and the projection lens is arranged such that the OFF-light is dispersed in a direction that coincides with a minor axis direction of the oval-shaped pupil. In this way, the dispersed OFF-light is blocked by the oval-shaped pupil, and thus does not reach the screen, which helps reduce degradation of the contrast of an image projected on the screen (SID 02 DIGEST 46.1: Advances in Contrast Enhancement for DLP Projection Displays, SID Symposium Digest of Technical Papers, May 2002, Volume 33, Issue 1, pp. 1246-1249).

In the image projection apparatus, the light (ON-light, imaged light) reflected by the mirrors of the DMD is also outputted by being dispersed according to the diffraction orders. However, the related technology described above is no remedy for dealing with the dispersed ON-light; on the contrary, the path of the ON-light to the screen is obstructed, and thus the brightness of an image projected onto the screen is degraded. In other words, the related technology is not so configured as to be able to reduce the effect of diffraction on the image light, and as a result, the transmission efficiency of the image light is disadvantageously degraded. In particular, in a case in which the light source is a laser light source, since the wavelength range of laser light is narrow, the effect of diffraction is so great that the transmission efficiency of the image light projected on the screen may be greatly degraded.

SUMMARY OF THE INVENTION

An object of the present invention is to reduce degradation of transmission efficiency of image light resulting from dispersion of the image light due to diffraction occurring when the image light emerges from a DMD used as a display device, to thereby provide an image projection apparatus capable of projecting bright and satisfactory images.

According to one aspect of the present invention, an image projection apparatus includes: a light source formed with a discharge lamp; a display device which displays blue, green, and red images by modulating illumination light from the light source at pixels; and a projection lens which projects the blue, green, and red images which are displayed at the display device. Here, the display device is formed with a digital micromirror device which reflects the illumination light with mirrors functioning as the pixels such that, as ON-light, light representing the image is directed to the projection lens, and, as OFF-light, light not representing the image is directed to an outside of the projection lens; and the following conditional expression is satisfied: $\beta_{(2\cdot k-1)} \geq 2\cdot\gamma - \beta_{(2\cdot k)} \geq_{(2\cdot k+1)}$, where $\beta_{(m)}$ denotes a diffraction angle of an mth-order diffracted light beam resulting from diffraction that occurs when the illumination light is incident on an image display surface of the display device, $\beta_{(m)}$ satisfying the following equation: $\beta_{(m)} = \sin^{-}\{\sin\alpha - m\cdot\lambda/(\sqrt{2}\cdot d)\}$; $\gamma$ denotes an angle that is, when a beam of the illumination light incident on the display device is specularly reflected by the mirrors of the display device which output the ON-light, formed between a direction in which the specularly reflected beam of the illumination light is outputted and a normal line of the image display surface, $\gamma$ satisfying the following equation: $\gamma=\alpha-2\cdot\theta$; d denotes a pixel pitch of the display device; $\alpha$ denotes an incidence angle of a beam of the illumination light incident on the display device with respect to the normal line of the image display surface; $\theta$ denotes a tilt angle of a normal line of the mirrors of the display device which output the ON-light with respect to the normal line of the image display surface; $\lambda$ denotes a wavelength, the wavelength being 480 nm in a case of blue image display, 550 nm in a case of green image display, and 620 nm in a case of red image display; m denotes a positive integer; and k denotes a negative integer.

According to another aspect of the present invention, an image projection apparatus includes: a laser light source which emits blue, green, and red laser light; a display device which displays blue, green, and red images by modulating illumination light from the laser light source at pixels; and a projection lens which projects the blue, green, and red images which are displayed at the display device. Here, the display device is formed with a digital micromirror device which reflects the illumination light with mirrors functioning as the pixels such that, as ON-light, light representing the image is directed to the projection lens, and, as OFF-light, light not representing the image is directed to an outside of the projection lens; and the following conditional expression is satisfied: $\beta_{(2\cdot k-1)}\geq 2\cdot\gamma-\beta_{(2\cdot k+1)}$, where $\beta_{(m)}$ denotes a diffraction angle of an mth-order diffracted light beam resulting from diffraction that occurs when the illumination light is incident on an image display surface of the display device, $\beta_{(m)}$ satisfying the following equation: $\beta_{(m)}=\sin^{-1}\{\sin\alpha-m\cdot\lambda/(\sqrt{2}\cdot d)\}$; $\gamma$ denotes an angle that is, when a beam of the illumination light incident on the display device is specularly reflected by the mirrors of the display device which output the ON-light, formed between a direction in which the specularly reflected beam of the illumination light is outputted and a normal line of the image display surface, $\gamma$ satisfying the following equation: $\gamma=\alpha-2\cdot\theta$; d denotes a pixel pitch of the display device; $\alpha$ denotes an incidence angle of a beam of the illumination light incident on the display device with respect to the normal line of the image display surface; $\theta$ denotes a tilt angle of a normal line of the mirrors of the display device which output the ON-light with respect to the normal line of the image display surface; $\lambda$ denotes a wavelength, the wavelength being a wavelength of blue laser light emitted from the laser light source in a case of blue image display, a wavelength of green laser light emitted from the laser light source in a case of green image display, and a wavelength of red laser light emitted from the laser light source in a case of red image display; m denotes a positive integer; and k denotes a negative integer.

DETAILED DESCRIPTION OF PREFERRED EMBODIMENTS

Hereinafter, embodiments of the present invention will be described with reference to the accompanying drawings, but it should be understood that the present invention is not limited to these embodiments. Also, the application of the present invention described herein and terms used in the description should not be construed in a limited manner.

First Embodiment

Figure 1:
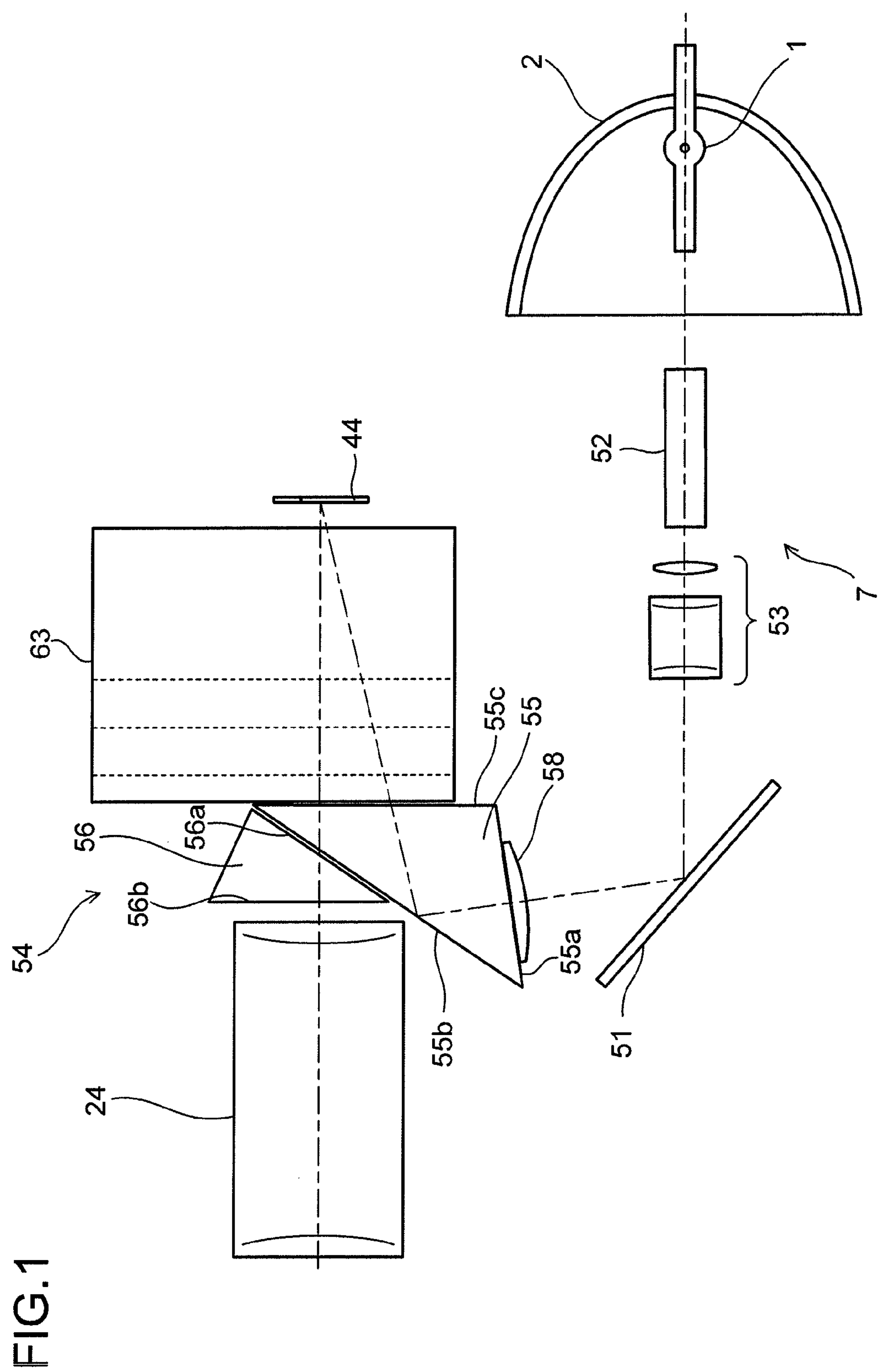
[FIG. 1] A sectional view schematically showing the configuration of an image projection apparatus according to a first embodiment of the present invention.
Figure 2:
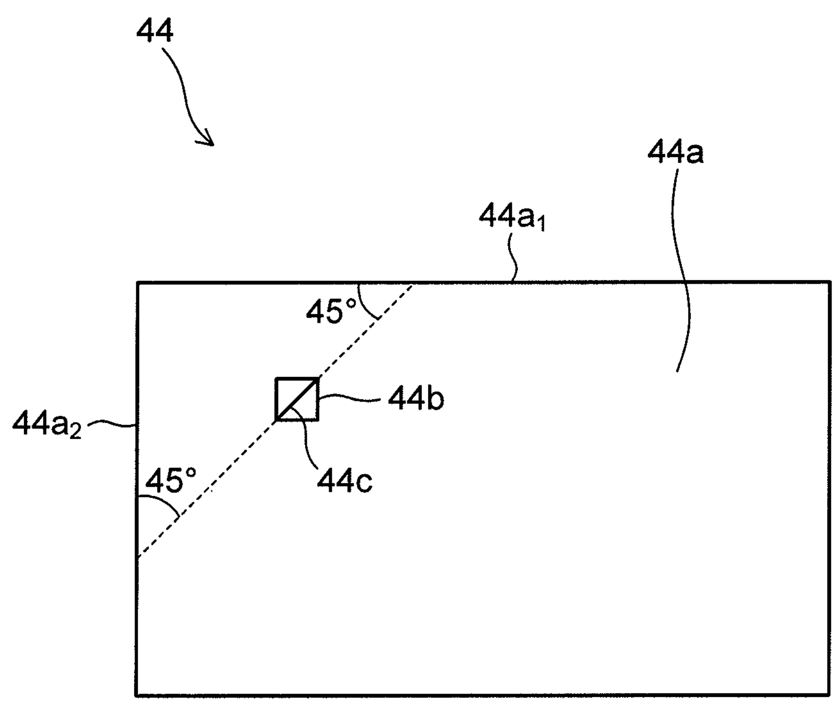
[FIG. 2] A plan view of a DMD of the image projection apparatus.
Figure 3:
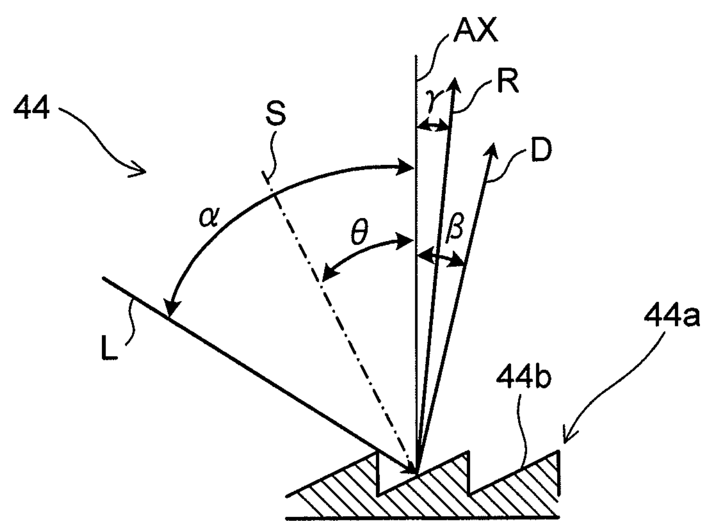
[FIG. 3] A sectional view of the DMD of the image projection apparatus.
Figure 4:
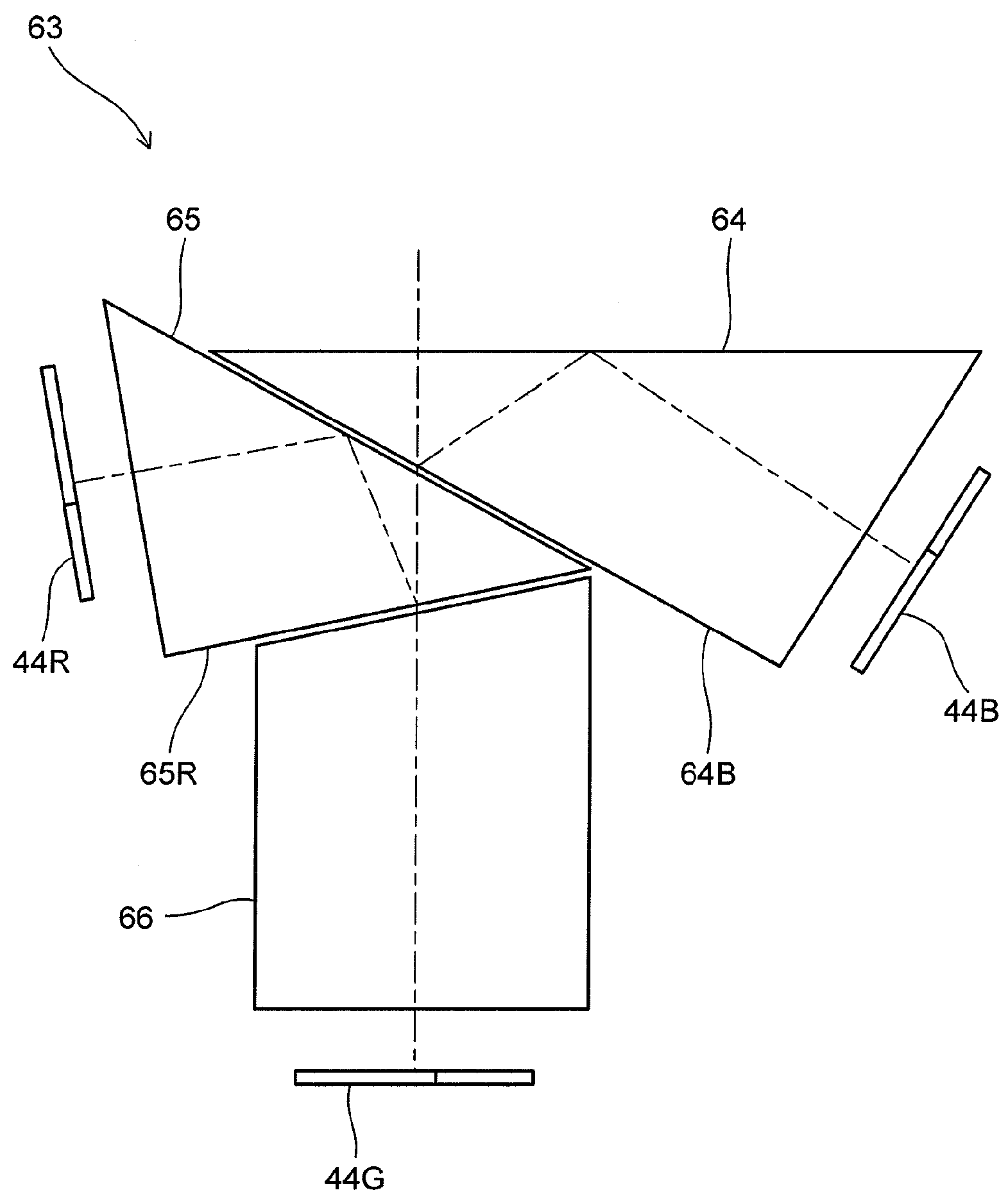
[FIG. 4] A sectional view of a color prism of the image projection apparatus.

FIG. 1 is a sectional view schematically showing the configuration of an image projection apparatus according to a first embodiment of the present invention, FIG. 2 is a plan view of a DMD of the image projection apparatus, FIG. 3 is a sectional view of the DMD in an ON-light outputting state, and FIG. 4 is a sectional view of a color prism of the image projection apparatus.

As shown in FIG. 1, the image projection apparatus includes a light source 1, a rod integrator 52, an illumination relay system 53, a deflecting mirror 51, a TIR prism 54, a color prism 63 functioning as color splitting and integrating means, a DMD 44 functioning as a display device, and a projection lens 24.

The light source 1 is a discharge lamp which emits white light. A reflector 2 is a reflecting plate which reflects light emitted from the light source 1 to direct the reflected light to an illumination optical system 7. The reflector 2 has a spheroidal reflection surface, and the light source 1 is disposed at a focal position of the reflector 2. The light from the light source 1 is reflected from the reflector 2 to enter the rod integrator 52.

The rod integrator 52 uniformizes the light amount distribution of the light from the light source 1 and outputs the resulting light. The sectional shape of the rod integrator 52 is substantially similar to the shape of the rectangular image-display area of the DMD 44. Thus, the rod integrator 52 constitutes an integrator optical system which forms an illumination light flux having a shape that is substantially similar to the shape of the rectangular image-display area of the DMD 44. The long-side direction of the rod integrator 52 is actually tilted by 45° and skew with respect to an entrance surface of the TIR prism 54, but in FIG. 1, the long-side direction is indicated as being parallel with the entrance surface for the purpose of making the description easy to understand. The entrance surface of the TIR prism 54 is a surface that, when a central light ray of a light flux is incident on a surface of the TIR prism 54, includes the central light ray incident on the surface and a normal line of the surface at the incident point.

On a pupil plane of the illumination relay system 53, a plurality of secondary light source images are formed in accordance with the number of times of reflection occurring inside the rod integrator 52. A light exit surface of the rod integrator 52 and the image display area of the DMD 44 are substantially conjugated with each other by the illumination relay system 53.

The illumination relay system 53 is an optical system that uniformly illuminates the DMD 44 by relaying images formed on the light exit surface of the rod integrator 52 and projecting the images onto the DMD 44. By condensing light from the rod integrator 52 by the illumination relay system 53, it is possible to improve the efficiency in using the light.

The deflecting mirror 51, which is a mirror that reflects light coming out from the illumination relay system 53 to direct the light to an entrance lens 58, bends the optical path to thereby make it possible to achieve a compact configuration of the image projection apparatus.

The entrance lens 58 is a lens for illuminating the DMD 44 in a substantially telecentric manner, and it is disposed on the light entrance side of the TIR prism 54.

With this configuration, light that enters the rod integrator 52 from the light source 1 is repeatedly reflected within the rod integrator 52 to be mixed into light having uniform light amount distribution, and is then outputted from the light exit surface. According to the number of times of reflection occurring inside the rod integrator 52, a plurality of secondary light source images are formed inside the illumination relay system 53, and by superposing these images on one another, it is possible to achieve illumination light having uniform light amount distribution. The light outputted from the rod integrator 52 is guided to the DMD 44 via the illumination relay system 53 and the TIR prism 54.

The TIR prism 54 is a total reflection prism (critical angle prism) that totally reflects the illumination light to be sent to the DMD 44, and transmits image light which is generated at the DMD 44. The optical path of the illumination light is bent by the TIR prism 54, and thereby it is possible to make the configuration of the image projection apparatus compact.

The TIR prism 54 is formed of two prisms 55, 56 which are fixed to each other with an air gap layer in between. The prism 55 has a first light entrance surface 55*a*, a critical surface 55*b*, and a first light exit surface 55*c*; the prism 56 has a second light entrance surface 56*a* and a second light exit surface 56*b*. The critical surface 55*b* of the prism 55 and the second light entrance surface 56*a* of the prism 56 are disposed facing each other with the air gap layer in between.

The illumination light from the illumination relay system 53 enters the prism 55 of the TIR prism 54 through the first light entrance surface 55*a*. The critical surface 55*b* of the prism 55 is disposed so as to totally reflect the illumination light; the illumination light is reflected by the critical surface 55*b* to be outputted from the first light exit surface 55*c* of the prism 55, so as to illuminate the DMD 44 via the color prism 63.

As shown in FIG. 2, the DMD 44 has a rectangular image display area 44*a*; each of mirrors 44*b* that function as pixels has a rotation shaft 44*c* that is positioned at an angle of 45° with respect to a long side $\mathbf{44}a_1$ and a short side $\mathbf{44}a_2$ of the image display area 44*a*. Incidentally, the mirrors 44*b* are arranged along the directions of the long side $\mathbf{44}a_1$ and the short side $\mathbf{44}a_2$ in the image display area 44*a* of the DMD 44 in practice, but in FIG. 2, for the convenience of description, just one of the mirrors 44*b* is illustrated.

Each of the mirrors 44*b* of the DMD 44, in a state in which it is tilted at a predetermined angle with respect to the optical axis of the illumination light, reflects the illumination light to thereby output the ON-light as the image light in a direction perpendicular to the image display area 44*a* of the DMD 44. On the other hand, by each of the mirrors 44*b* reflecting the illumination light in a state in which the mirrors 44*b* are each tilted by an angle that is different from the angle at which they are tilted when the ON-light is outputted, the OFF-light is outputted at an exit angle that is larger than the exit angle of the ON-light. Now a detailed description will be given of a state in which the ON-light is incident on and leaves each of the mirrors 44*b* with reference to FIG. 3.

The mirror normal line S of each of the mirrors 44*b* (the mirror 44*b*) of the DMD 44 is tilted by a tilt angle θ with respect to a normal line Ax of an image display surface. Here, assuming that the display area 44*a* of the DMD 44 is a flat surface, the normal line Ax of the image display surface is a normal line with respect to that flat surface. An illumination light beam L is incident on the mirror 44*b*, and a specularly reflected light beam leaves the mirror 44*b* to a position on a side opposite to the illumination light beam L at an angle, with respect to the mirror normal line S, equal to the incidence angle of the incident illumination light beam L. The direction in which the specularly reflected light beam is outputted is assumed to be a specular reflection direction R. Here, if the mirror normal line S, the illumination light beam L, and the specular reflection direction R are indicated with reference to the normal line Ax of the image display surface, the mirror normal line S is positioned at the tilt angle θ with respect to the normal line Ax of the image display surface. The illumination light beam L is incident on a pixel (the mirror 44*b*) at an incidence angle α with respect to the normal line Ax of the image display surface, and on the other hand, the specular reflection direction R is tilted by an angle γ with respect to the normal line Ax of the image display surface. In a case where the ON-light leaves the pixel (the mirror 44*b*), the relationship between the illumination light beam L and the specular reflection direction R is represented by the following equation (A). Here, the angle γ is a very small angle (for example, smaller than 5°). Diffracted light D and an angle of diffraction β of FIG. 3 will be described later.

$$\gamma=\alpha-2\cdot\theta \tag{A}$$

Back to FIG. 1, the ON-light which has left the DMD 44 is guided via the color prism 63, the TIR prism 54, and the projection lens 24 in this order, but the OFF-light, which leaves the mirror 44*b* at a large exit angle, does not enter the projection lens 24, and thus does not reach the screen. By controlling the tilt of each of the mirrors 44*b* (see FIG. 3) in the binary ON/OFF manner in this way, it is possible to display an image on the DMD 44 and project the image light of the image onto the screen.

As shown in FIG. 4, the color prism 63 is color splitting and integrating means disposed in the optical path between the TIR prism 54 (see FIG. 1) and the DMD 44. In this embodiment, the DMD 44 is composed of DMDs 44R, 44G, and 44B provided corresponding to the three colors of red, green, and blue, respectively. The color prism 63 separates the light from the TIR prism 54 into light of the three colors and guides the separated light to the DMDs 44R, 44G, and 44B, and also integrates light reflected from the DMDs 44R, 44G, and 44B into a single optical path.

The color prism 63 is formed by combining triangular prism-shaped first and second color prisms 64 and 65 and a substantially quadrangular prism-shaped third color prism 66. A dichroic surface 64B is formed on a surface of the first color prism 64 that faces the second color prism 65, and the dichroic surface 64B reflects light of the blue wavelength band and transmits light of the red and green wavelength bands. Incidentally, an air gap layer is provided between the first color prism 64 and the second color prism 65. A dichroic surface 65R is formed on a surface of the second color prism 65 that faces the third color prism 66, and the dichroic surface 65R reflects light of the red wavelength band and transmits light of the green wavelength band. Incidentally, an air gap layer is provided between the second color prism 65 and the third color prism 66.

In the illumination light that that has entered the first color prism 64 through a light entrance/exit surface thereof, the light of the blue wavelength band is reflected by the dichroic surface 64B while the light of red and green wavelength bands passes through the dichroic surface 64B. The light of the blue wavelength band that has been reflected by the dichroic surface 64B is totally reflected by a side surface of the first color prism 64, and leaves the first color prism 64 from the light entrance/exit surface of the first color prism 64 to illuminate the DMD 44B. On the other hand, among the light of the red and green wavelength bands that has passed through the dichroic surface 64B, the light of the red wavelength band is reflected by the dichroic surface 65R of the second color prism 65 while the light of the green wavelength band passes through the dichroic surface 65R. The light of the red wavelength band that has been reflected by the dichroic surface 65R is totally reflected by a side surface of the color prism 65, and leaves the second color prism 65 from the light entrance/exit surface of the second color prism 65 to illuminate the DMD 44R. The light of the green wavelength band that has passed through the dichroic surface 65R leaves the third color prism 66 from a light entrance/exit surface of the third color prism 66 to illuminate the DMD 44G.

The light incident on the DMDs 44R, 44G, and 44B is modulated there and then outputted as image light. Blue image light reflected from the DMD 44B is incident on a light entrance/exit surface of the first color prism 64 and is then totally reflected by a side surface of the first color prism 64, to be further reflected by the dichroic surface 64B. Red image light reflected from the DMD 44R is incident on a light entrance/exit surface of the second color prism 65 to be totally reflected by a side surface of the second color prism 65, and is then reflected on the dichroic surface 65R, to further pass through the dichroic surface 64B of the first color prism 64. On the other hand, green image light reflected from the DMD 44G is incident on a light entrance/exit surface of the third color prism 66 to pass through the dichroic surface 65R and the dichroic surface 64B. The blue, red, and green image light is integrated into one optical path, and leaves the color prism 63 to enter the TIR prism 54 (see FIG. 1). The image light resulting from the integration is enlarged and projected onto the screen (unillustrated) via the projection lens 24 (see FIG. 1).

Here, in each of the DMDs 44R, 44G, and 44B, the mirrors 44*b* (pixels, see FIG. 2) are arranged in the image display area 44*a* (see FIG. 2) in a matrix at a relatively narrow pitch in a state in which the mirrors 44*b* are tilted; thus the DMDs 44R, 44G, and 44B function as diffraction gratings, and diffracted light is generated from the ON-light outputted from the DMDs 44R, 44G, and 44B.

Figure 5:
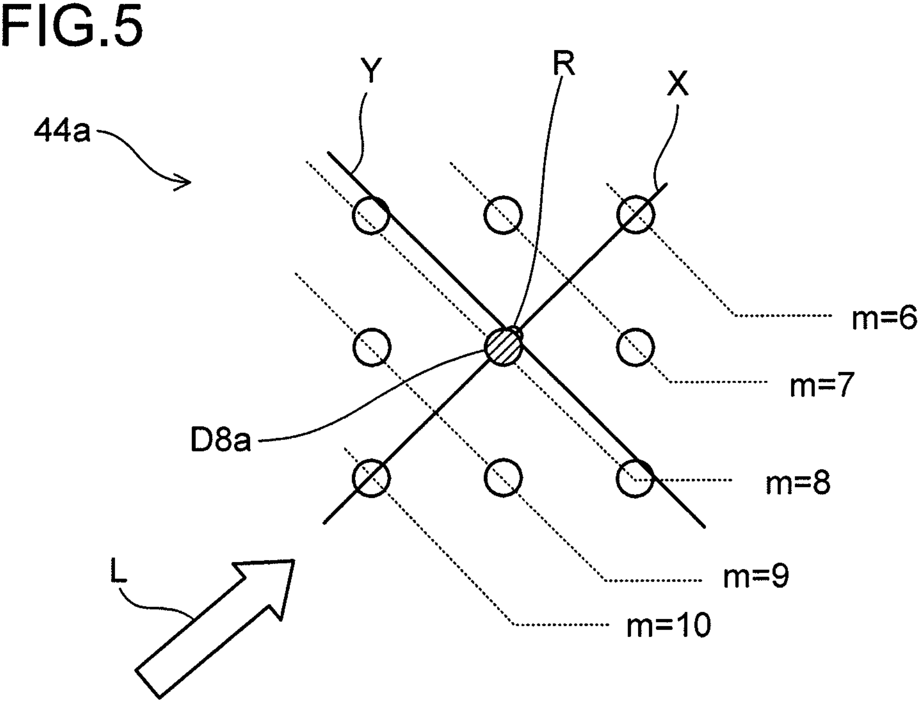
[FIG. 5] A plan view showing a state of diffraction occurring in the DMD.
Figure 6:
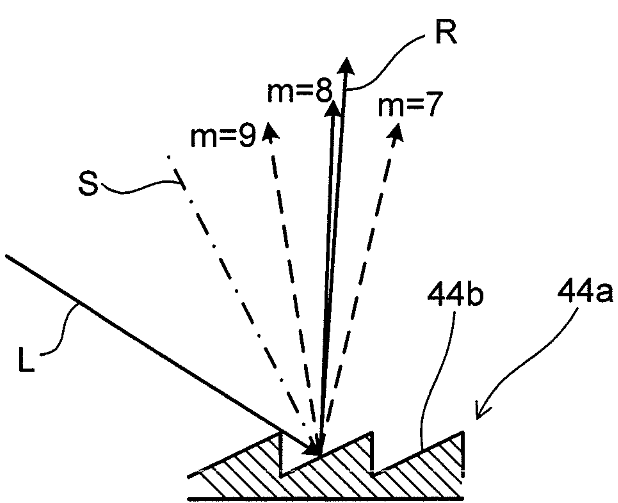
[FIG. 6] A sectional view showing the state of diffraction occurring in the DMD.
Figure 7:
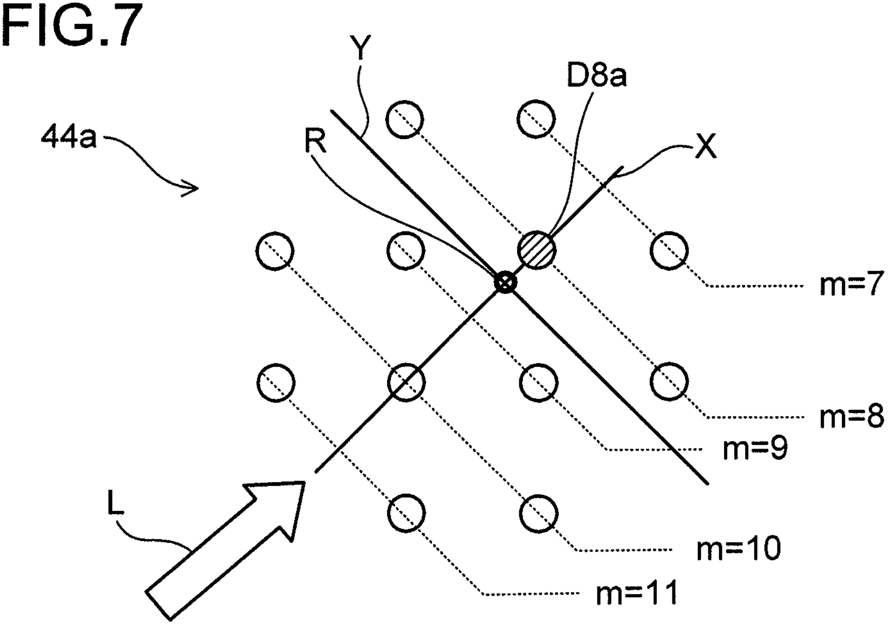
[FIG. 7] A plan view showing a state of diffraction in a modified example of the DMD.
Figure 8:
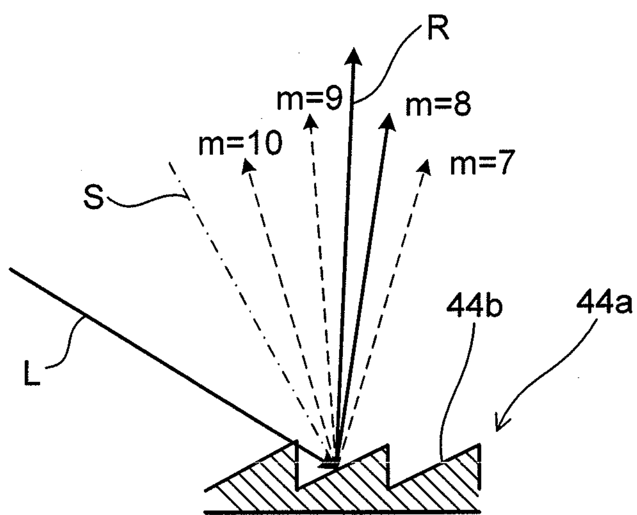
[FIG. 8] A sectional view showing the state of diffraction in the modified example of the DMD.
Figure 9:
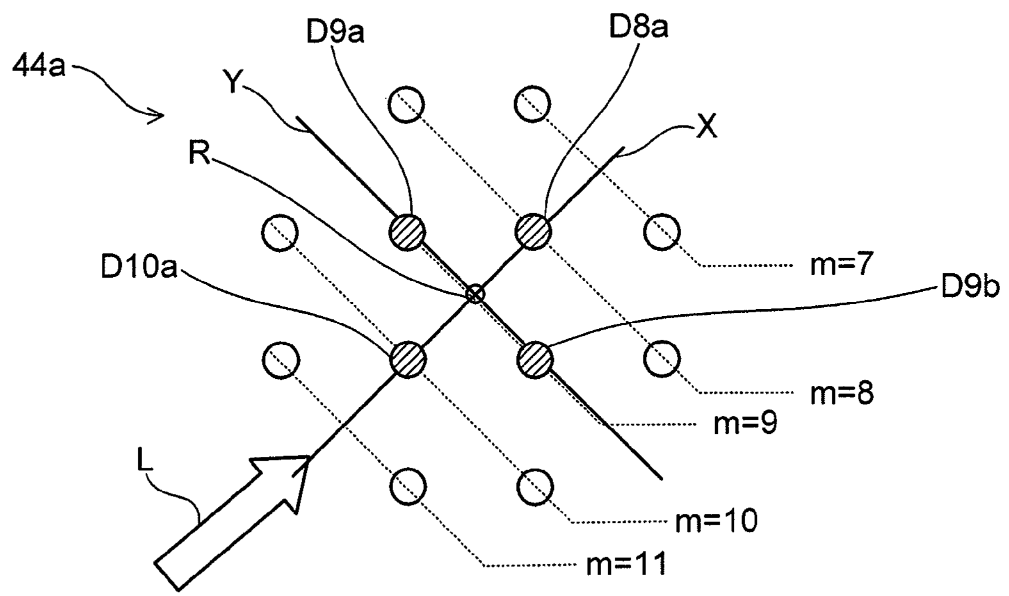
[FIG. 9] A plan view showing a state of diffraction in a reference example of the DMD.
Figure 10:
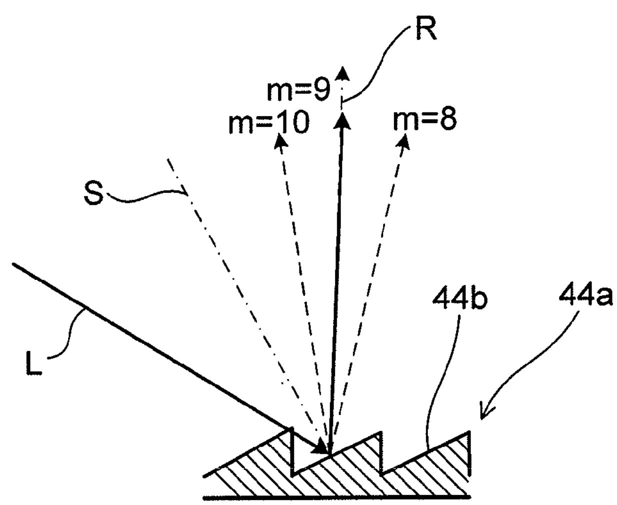
[FIG. 10] A sectional view showing the state of diffraction in the reference example of the DMD.

FIG. 5-FIG. 10 each show a state of diffraction of the ON-light in the DMD 44, FIG. 5, FIG. 7, and FIG. 9 are each a plan view of the image display area of the DMD 44, and FIG. 6, FIG. 8, and FIG. 10 are each a sectional view of each of the pixels of the DMD 44. FIG. 5 and FIG. 6 show an example of the diffraction state in this embodiment, FIG. 7 and FIG. 8 show another example of the diffraction state in this embodiment, and FIG. 9 and FIG. 10 show a reference example of the diffraction state.

As shown in FIG. 5, FIG. 7, and FIG. 9, the illumination light beam L is incident on the image display area 44*a*, and the incidence direction is the direction of a diagonal line X of the pixel (the mirror 44*b*, see FIG. 6), and when the illumination light beam L is incident on the pixel from the direction of the diagonal line X, the specular reflection direction R is positioned on the diagonal line X. A line that orthogonally crosses the diagonal line X on the image display area 44*a* will be referred to as an orthogonal line Y.

The illumination light beam L is reflected on the mirror 44*b* to be outputted as scattered light beams according to diffraction orders. As a result, beams of diffracted light appear at a plurality of positions along the direction of the orthogonal line Y according to the diffraction orders m. Among these beams of diffracted light, those with odd diffraction orders m (odd-order diffracted light) do not appear at positions on the diagonal line X, but appear, in a dispersed manner, at positions away from the specular reflection direction R. On the other hand, those with even diffraction orders m (even-order diffracted light) appear at positions on the diagonal line X. If a beam of diffracted light with an even diffraction order substantially coincides with the specular reflection direction R, the beam of diffracted light that substantially coincides with the specular reflection direction R is able to emerge with an amount of light (energy) that is close to the amount of light (energy) that the illumination light has, and thus the energy of the diffracted light is concentrated in the vicinity of the specular reflection direction R.

Hence, the DMD 44 is designed such that beams of diffracted light having the even diffraction orders substantially coincide with the specular reflection direction R. In FIG. 5, the pixel pitch d of the DMD 44 is 7.56 μm, the tilt angle θ (see FIG. 3) is 12°, the incidence angle α (see FIG. 3) and the wavelength λ of the illumination light L is 26° and 550 nm, respectively. In this case, an 8th-order diffracted light beam D8*a* which substantially coincides with the specular reflection direction R appears, having a light amount equivalent to approximately 98% of the light amount of the illumination light. Incidentally, the pixel pitch d is the pitch at which the mirrors 44*b* are arranged in the direction of the long side 44$a_1$ (the short side 44$a_2$, see FIG. 2) of the image display area 44*a*.

In FIG. 7, as shown in the sectional view of FIG. 8, the specular reflection direction R is exactly at the center between the even-order diffraction direction and the odd-order diffraction direction, and the pixel pitch d of the DMD 44 is 7.56 μm, the tilt angle θ (see FIG. 3) is 13°, the incidence angle α (see FIG. 3) and the wavelength λ of the illumination light L is 27.8° and 550 nm, respectively. In this case, the 8th-order diffracted light beam D8*a* appears in the vicinity of the specular reflection direction R, having a light amount equivalent to 66% of the light amount of the illumination light. In this way, if the difference between the even-order diffraction direction and the specular reflection direction R is at least of the same order of magnitude as the difference between the odd-order diffraction direction and the specular reflection direction R, it is possible to maintain a state in which energy is concentrated to some extent.

FIG. 9 shows a case in which, as shown in the sectional view of FIG. 10, the odd-order diffraction direction substantially coincides with the specular reflection direction R. Beams of the odd-order diffracted light appear along the orthogonal line Y including the specular reflection direction R but do not appear at positions on the diagonal line X, and thus, the beams of the odd-order and even-order diffracted light are dispersed away from, and surrounding, the specular reflection direction R. This significantly reduces the light amount of each of the beams of diffracted light in comparison with the light amount of the illumination light.

In FIG. 9, the pixel pitch d of the DMD 44 is 7.56 μm, the tilt angle θ (see FIG. 3) is 13.8°, the incidence angle α (see FIG. 3), and the wavelength λ of the illumination light L is 28.9° and 550 nm, respectively. In this case, a 9th-order diffracted light beams D9*a*, D9*b*, the 8th-order diffracted light beam D8*a*, and a 10th-order diffracted light beam D10*a* that appear at positions surrounding the specular reflection direction R each has a light amount which is, at most, equivalent to substantially 16% of the light amount of the illumination light. Further, in this case, there is an angle difference of as much as 3° between two diffracted light beams that are different from each other by one in terms of diffraction order; and thus, in comparison with an example of this embodiment (see FIGS. 5 and 6), in the reference example (FIGS. 9 and 10), the diffracted light beams appear in a greatly wider range with respect to the specular reflection direction R. This causes some amount of light to be blocked by the projection lens 24 (see FIG. 1), and as a result, the image light is transmitted with seriously degraded efficiency in comparison with the illumination light.

Thus, by setting the pixel pitch d, the tilt angle θ, the incident angle α of the illumination light beam L, etc. such that the diffracted light beams with the even orders appear closer to the specular reflection direction R than the diffracted light beams with the odd orders, it is possible to reduce the degradation of the efficiency of transmitting the image light caused by dispersion of diffraction.

Here, as shown in FIG. 3, assuming that the angle of a diffracted light beam D with respect to the normal line Ax of the image display surface is a diffraction angle β, and the diffraction order is m, the diffraction angle $\beta_{(m)}$ of an mth order diffracted light beam is represented by the following equation (B).

$$\beta_{(m)}=\sin^{-1}\{\sin\alpha-m\cdot\lambda/(\sqrt{2}\cdot d)\} \qquad (B)$$

where d: the pixel pitch of the DMD 44 (unit: μm), α: the incidence angle of illumination light beam with respect to the normal line Ax of the image display surface: (unit: ° (degree)), m: a positive integer, and λ: the wavelength of the color of light that illuminates the DMD 44 (unit: nm).

The diffraction angle $\beta_{(2k)}$ of an even-order diffracted light beam D is represented by the following equation (C). Here, k is an integer.

$$\beta_{(2k)}=\sin^{-1}\{\sin\alpha-2\cdot k\cdot\lambda/(\sqrt{2}\cdot d)\} \qquad (C)$$

The diffraction angle $\beta_{(2k+1)}$ and $\beta_{(2k-1)}$ of an odd-order diffracted light beam D is represented by the following equation (D) and (E).

$$\beta_{(2k+1)}=\sin^{-1}\{\sin\alpha-(2\cdot k+1)\cdot\lambda/(\sqrt{2}\cdot d)\} \qquad (D)$$

$$\beta_{(2k-1)}=\sin^{-1}\{\sin\alpha-(2\cdot k-1)\cdot\lambda/(\sqrt{2}\cdot d)\} \qquad (E)$$

If the following conditional expressions (F) and (G) are both satisfied, the diffracted light is dispersed such that the even-order diffracted light beams D appear closer to the specular reflection direction R than the odd-number diffracted light beams D.

$$\beta_{(2k-1)}-\gamma\geq\gamma-\beta_{(2k)} \qquad (F)$$

$$\gamma-\beta_{(2k+1)}\geq\beta_{(2k)}-\gamma \qquad (G)$$

where γ denotes an angle of the specular reflection direction R with respect to the normal line Ax of the image display surface, and as shown in the equation (A), γ is equal to α−2·θ.

From the conditional expressions (F) and (G), the following conditional expression (1) can be derived.

$$\beta_{(2\cdot k-1)}\geq 2\cdot\gamma-\beta_{(2\cdot k)}\geq\beta_{(2\cdot k+1)} \qquad (1)$$

If the configuration of the DMD 44 and the wavelength of the illumination light are set such that the diffraction light beams D satisfy the conditional expression (1) with respect to the angle γ of the specular reflection direction R, among the diffracted light beams D, the odd-order diffracted light beams D appear at positions away from the specular reflection direction R and thus energy of the diffracted light is reduced, while the even-order diffracted light beams D substantially coincide with, or appear close to, the specular reflection direction R and thus energy is concentrated on the diffracted light beams D that appear in the vicinity of the specular reflection direction R; as a result, degradation of the efficiency of transmitting the image light is reduced, which contributes to bright and excellent image projection.

A more detailed description will be given of the above-described embodiment with reference to Examples 1 to 5 (Tables 1 to 5). In the tables, λ denotes the central wavelength of the color of light that illuminates the DMD 44 (unit: nm), d denotes the pixel pitch of the DMD 44 (unit: μm), θ denotes the tilt angle of a mirror (unit: degree), α denotes the incidence angle of the illumination light beam L (unit: degree), γ denotes the angle of the specular reflection direction R (unit: °), β denotes the diffraction angle (unit: degree), and k denotes a positive integer. The 480-nm wavelength is the central wavelength of blue illumination light, the 550-nm wavelength is the central wavelength of green illumination light, and the 620-nm wavelength is the central wavelength of red illumination light. The diffraction angle β is given a positive value in the clockwise direction from the normal line Ax of the image display surface, and a negative value in the counter-clockwise direction from the normal line Ax of the image display surface. "Light Amount of 2kth-order Diffracted Light Beam (unit: %)" indicates the ratio of the light amount of a 2kth-order diffracted light beam to the light amount of the illumination light beam L.

TABLE 1

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 480 nm | 8.15 μm | 12° | 26° | 2° | −1.13° | 1.26° | 3.64° | 96.30% | 10 |
| 550 nm | 8.15 μm | 12° | 26° | 2° | 0.51° | 3.25° | 5.99° | 70.70% | 8 |
| 620 nm | 8.15 μm | 12° | 26° | 2° | −2.62° | 0.46° | 3.54° | 65.80% | 8 |

TABLE 2

| λ | d | θ | α | γ | β 2k + 1 | β 2k | β 2k − 1 | Light amount of 2kth-order diffracted light beam | 2k |
|---|---|---|---|---|---|---|---|---|---|
| 480 nm | 13.68 μm | 12° | 24° | 0° | −0.86° | 0.56° | 1.98° | 77.2% | 16 |
| 550 nm | 7.56 μm | 12° | 24° | 0° | −3.22° | −0.28° | 2.67° | 98.6% | 8 |
| 620 nm | 10.8 μm | 12° | 24° | 0° | −2.28° | 0.05° | 2.37° | 99.9% | 10 |

TABLE 3

| λ | d | θ | α | γ | β 2k + 1 | β 2k | β 2k − 1 | Light amount of 2kth-order diffracted light beam | 2k |
|---|---|---|---|---|---|---|---|---|---|
| 480 nm | 8.41 μm | 12° | 26° | 2° | −0.32° | 1.99° | 4.31° | 100.0% | 10 |
| 550 nm | 7.71 μm | 12° | 26° | 2° | −0.89° | 2.00° | 4.89° | 100.0% | 8 |
| 620 nm | 8.69 μm | 12° | 26° | 2° | −0.90° | 1.99° | 4.89° | 100.0% | 8 |

TABLE 4

| λ | d | θ | α | γ | β 2k + 1 | β 2k | β 2k − 1 | Light amount of 2kth-order diffracted light beam | 2k |
|---|---|---|---|---|---|---|---|---|---|
| 480 nm | 7.56 μm | 10.5° | 21° | 0° | −2.62° | −0.05° | 2.53° | 100.0% | 8 |
| 550 nm | 7.56 μm | 12° | 24° | 0° | −3.22° | −0.28° | 2.67° | 98.6% | 8 |
| 620 nm | 7.56 μm | 10.5° | 21° | 0° | −2.73° | 0.60° | 3.29° | 94.8% | 6 |

TABLE 5

| λ | d | θ | α | γ | β 2k + 1 | β 2k | β 2k − 1 | Light amount of 2kth-order diffracted light beam | 2k |
|---|---|---|---|---|---|---|---|---|---|
| 480 nm | 7.56 μm | 10.6° | 23.2° | 2° | −0.57° | 2.00° | 4.58° | 100.0% | 8 |
| 550 nm | 7.56 μm | 12.25° | 26.5° | 2° | −0.96° | 1.99° | 4.94° | 100.0% | 8 |
| 620 nm | 7.56 μm | 10.25° | 22.5° | 2° | −1.33° | 1.99° | 5.32° | 100.0% | 6 |

Examples 1 to 5 all satisfy the conditional expression (1). Further, in Examples 2 and 3, the pixel pitches d of the DMDs 44R, 44G, and 44B are different from one another. By configuring the DMD 44 such that the pixel pitch d of any one of the DMDs 44R, 44G, and 44B is different from the pixel pitches d of the others, it is possible to make the even-order diffracted light beams D appear closer to a reflection axis R, to thereby reduce the degradation of the light amount of the diffracted light beam D with respect to the light amount of the illumination light beam L.

In Example 4, the tilt angle θ of the DMD 44G is set different from those of the DMDs 44B and 44R. In Example 5, the tilt angles θ of the DMDs 44R, 44G, and 44B are different from one another. By configuring the DMD 44 such that the tilt angle θ of any one of the DMDs 44R, 44G, and 44B is different from the tilt angles θ of the others, it is possible to make the even-order diffracted light beams D appear closer to a reflection axis R, to thereby reduce the degradation of the light amount of the diffracted light beam D with respect to the light amount of the illumination light beam L.

In Example 1, the DMDs for the three colors have the same pixel pitch d, the same tilt angle θ, and the same incidence angle of the illumination light beam L, and thus there is no need of giving different configurations to the illumination optical systems of the three colors, which makes it possible to provide an inexpensive image projection apparatus.

Figure 11:
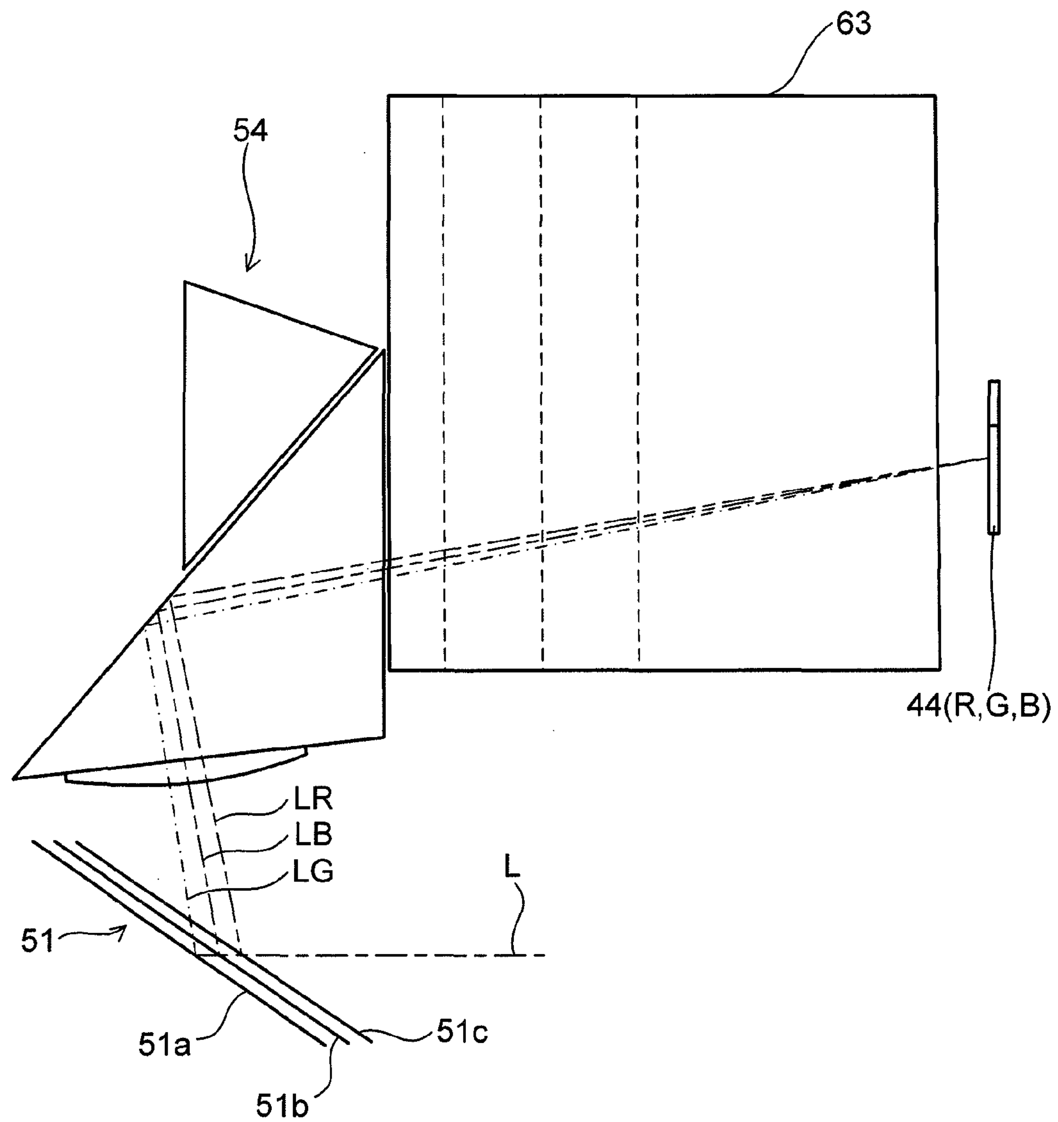
[FIG. 11] A sectional view of a mirror of the image projection apparatus.

In Examples 4 and 5 described above, the incidence angles α of the blue, green, and red illumination light beams L are different from each other. For example, as shown in Example 5, in the case in which the incidence angles α of the blue, green, and red illumination light beams L are different from each other, it is preferable to configure the deflecting mirror 51 as shown in FIG. 11. FIG. 11 shows a sectional view of the deflecting mirror 51.

The deflecting mirror 51 includes a reflecting mirror 51*a*, a blue-reflecting dichroic mirror 51*b*, and a red-reflecting dichroic mirror 51*c*.

The blue-reflecting dichroic mirror 51*b*, which reflects blue light but transmits green light, is disposed to be tilted by a predetermined tilt angle with respect to the reflecting mirror

51*a*. This tilt angle is provided for correcting the difference in incidence angle α of illumination light between on the DMD 44G and on the DMD 44B.

The red-reflecting dichroic mirror 51*c*, which reflects red light but transmits blue and green light, is disposed to be tilted by a predetermined angle with respect to the reflecting mirror 51*a*. This tilt angle is provided for correcting the difference in incidence angle α of illumination light between on the DMD 44G and on the DMD 44R.

The deflecting mirror 51 is configured such that the blue-reflecting dichroic mirror 51*b* is disposed in front of the reflecting mirror 51*a*, and the red-reflecting dichroic mirror 51*c* is disposed in front of the blue-reflecting dichroic mirror 51*b*.

With this configuration, illumination light L is reflected by the deflecting mirror 51, and red light LR in the reflected illumination light L is reflected by the red-reflecting dichroic mirror 51*c* and illuminates the DMD 44R via the TIR prism 54 and the color prism 63 in this order. Blue light LB in the illumination light L passes through the red-reflecting dichroic mirror 51*c*, then it is reflected by the blue-reflecting dichroic mirror 51*b*, and thereafter, it passes through the red-reflecting dichroic mirror 51*c*, to illuminate the DMD 44B via the TIR prism 54 and the color prism 63 in this order. Green light LG in the illumination light L passes through the red-reflecting dichroic mirror 51*c* and the blue-reflecting dichroic mirror 51*b*, then it is reflected by the reflecting mirror 51*a*, and after being thus reflected, it passes through the blue-reflecting dichroic mirror 51*b* and the red-reflecting dichroic mirror 51*c*, and illuminates the DMD 4G via the TIR prism 54 and the color prism 63 in this order. The illumination light LR, LG, and LR is incident on the DMDs 44R, 44G, and 44B according to the incidence angles α of the DMDs 44R, 44G, and 44B.

Note that, as shown in Example 4 (Table 4), in a case in which the incidence angle of the green illumination light beam is different from those of the blue and red illumination light beams, the tilt angles of the blue-reflecting dichroic mirror 51*b* and the red-reflecting dichroic mirror 51*c* may be tilted by the same predetermined angle with respect to the reflecting mirror 51*a*, or, instead of the blue-reflecting dichroic mirror 51*b* and the red-reflecting dichroic mirror 51*c*, a blue-and-red reflecting mirror, which reflects red light and blue light but transmits green light, may be provided to be tilted by a predetermined angle.

Second Embodiment

Figure 12:
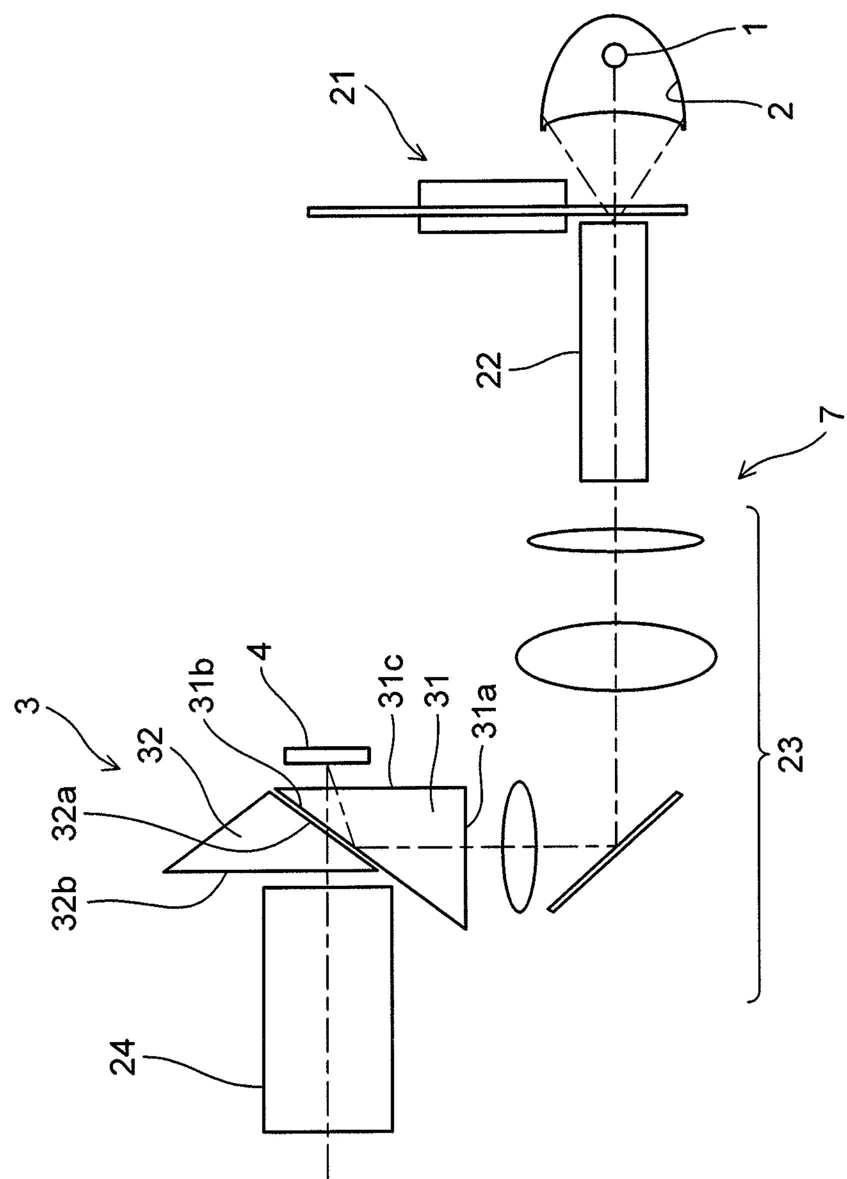
[FIG. 12] A sectional view schematically showing the configuration of an image projection apparatus according to a second embodiment of the present invention.

FIG. 12 is a sectional view schematically showing the configuration of an image projection apparatus according to a second embodiment of the present invention. In this embodiment, a display device is configured with a DMD 4, and the DMD 4 has the same configuration as in the first embodiment. An image projection apparatus includes a light source 1, an illumination optical system 7, a TIR prism 3, the DMD 4, and a projection lens 24. The long-side direction of the rod integrator 22 is actually tilted by 45° and skew with respect to an entrance surface of the TIR prism 3, but in FIG. 12, for making the description easy to follow, the long-side direction and the entrance surface are indicated within the same plane. The entrance surface of the TIR prism 3 is a surface that, when a central ray of a light flux is incident on a surface of the TIR prism 54, includes the central ray incident on the surface and a normal line at the incident point on the surface.

In this configuration, light emitted from the light source 1 enters the TIR prism 3 via the illumination optical system 7, where the light is totally reflected, and then the light is incident on the DMD 4. The light incident on the DMD 4 is modulated there to be outputted as image light, which then passes through the TIR prism 3 and guided via the projection lens 24 to a screen (not shown) which is a surface for projecting images thereon. By the projection lens 24, images displayed on the DMD are increased and projected on the screen.

The light source 1 is a discharge lamp which emits white light. A reflector 2 is a reflection plate which reflects light emitted from the light source 1 to direct the light to the illumination optical system 7. The reflector 2 has a spheroidal reflection surface, and the light source 1 is disposed at a focal position of the reflector 2. The light from the light source 1 is reflected on the reflector 2 and enters the rod integrator 22.

The illumination optical system 7 is an optical system that guides the light from the light source 1 to the DMD 4, and includes a color wheel 21, the rod integrator 22, and an illumination relay system 23.

The color wheel 21 is built as a color filter that sequentially transmits blue light, green light, and red light. By turning the color wheel 21, it is possible to temporally sequentially illuminate the DMD4 with light of different colors; thus, by displaying image light corresponding to the different colors, it is possible to form a multicolor projection image.

The rod integrator 22 uniformizes the light amount distribution of the light from the light source 1 and outputs the resulting light. The sectional shape of the rod integrator 22 is substantially similar to the shape of the rectangular image-display area of the DMD 4. Thus, the rod integrator 22 constitutes an integrator optical system which forms an illumination light flux having a shape that is substantially similar to the shape of the rectangular image-display area of the DMD 4.

On a pupil plane of the illumination relay system 23, a plurality of secondary light source images are formed in accordance with the number of times of reflection occurring inside the rod integrator 22. A light exit surface of the rod integrator 22 and the image display area of the DMD 4 are substantially conjugated with each other by the illumination relay system 23.

The illumination relay system 23 is an optical system that uniformly illuminates the DMD 4 by relaying images formed on the light exit surface of the rod integrator 22 and projecting the images onto the DMD 4. By condensing light from the rod integrator 22 by the illumination relay system 23, it is possible to improve the efficiency in using the light.

With this configuration of the illumination optical system 7, light of the different colors that enters the rod integrator 22 via the color wheel 21 from the light source 1 on a time-division basis is repeatedly reflected within the rod integrator 22 to be mixed into light having uniform light amount distribution, and is then outputted through the light exit surface. According to the number of times of reflection occurring inside the rod integrator 52, a plurality of secondary light source images are formed inside the illumination relay system 53, and by superposing these images on one another, it is possible to achieve illumination light having uniform light amount distribution. The light outputted from the rod integrator 22 is guided to the DMD 4 via the illumination relay system 23 and the TIR prism 3. At this time, since the sectional shape of the rod integrator 22 is substantially similar to the shape of the rectangular image-display area of the DMD 4, light is guided to the DMD 4 not only uniformly but also efficiently.

The TIR prism 3 is a total reflection prism (critical angle prism) that totally reflects the illumination light to be sent to the DMD 4, and transmits the image light from the DMD 4. The TIR prism 3 is formed of two prisms 31, 32 which are fixed to each other with an air gap layer in between. The prism 31 has a first light entrance surface 31*a*, a critical surface 31*b*, and a first light exit surface 31*c*; the prism 32 has a second light entrance surface 32*a* and a second light exit surface 32*b*. The critical surface 31*b* of the prism 31 and the second light entrance surface 32*a* of the prism 32 are disposed facing each other with the air gap layer in between.

The illumination light from the illumination optical system 7 enters the prism 31 of the TIR prism 3 through the first light entrance surface 31*a*. The critical surface 31*b* of the prism 31 is disposed to totally reflect the illumination light; the illumination light is reflected by the critical surface 31*b* to be outputted from the first light exit surface 31*c* of the prism 31, so as to illuminate the DMD 4.

ON-light included in the light reflected from the DMD 4 enters the prism 31 again through the first light exit surface 31*c* of the prism 31 and reaches the critical surface 31*b*; at this time, the ON-light is incident on the critical surface 31*b* at an angle that does not satisfy the total-reflection condition, and thus, the ON-light passes through the critical surface 31*b* and, via the air gap layer, enters the prism 32 from the second light entrance surface 32*a* to be guided to the screen via the second light exit surface 32*b* and the projection lens 24.

Here, the DMD 4 has the same configuration as the DMD 44; the pitch of the mirrors is comparatively small, and the mirrors are arranged in the image display area in a matrix in a state in which they are tilted, and thus the DMD 4 functions as a diffraction grating to generate diffracted light from the ON-light that is outputted from the DMD 4.

Thus, like in the first embodiment, the pixel pitch d, the tilt angle θ, and the incidence angle α, etc. of the configuration of the DMD 4 and the wavelength of the illumination light are set such that even-order diffracted light beams D appear closer to the specular reflection direction R than odd-order diffracted light beams D. This makes it possible to reduce the degradation of the efficiency of transmitting the image light caused by dispersion of diffraction. Specifically, by setting them so as to satisfy the conditional expression (1) as in the above described example 1, the above-described effect can be obtained.

Figure 13:
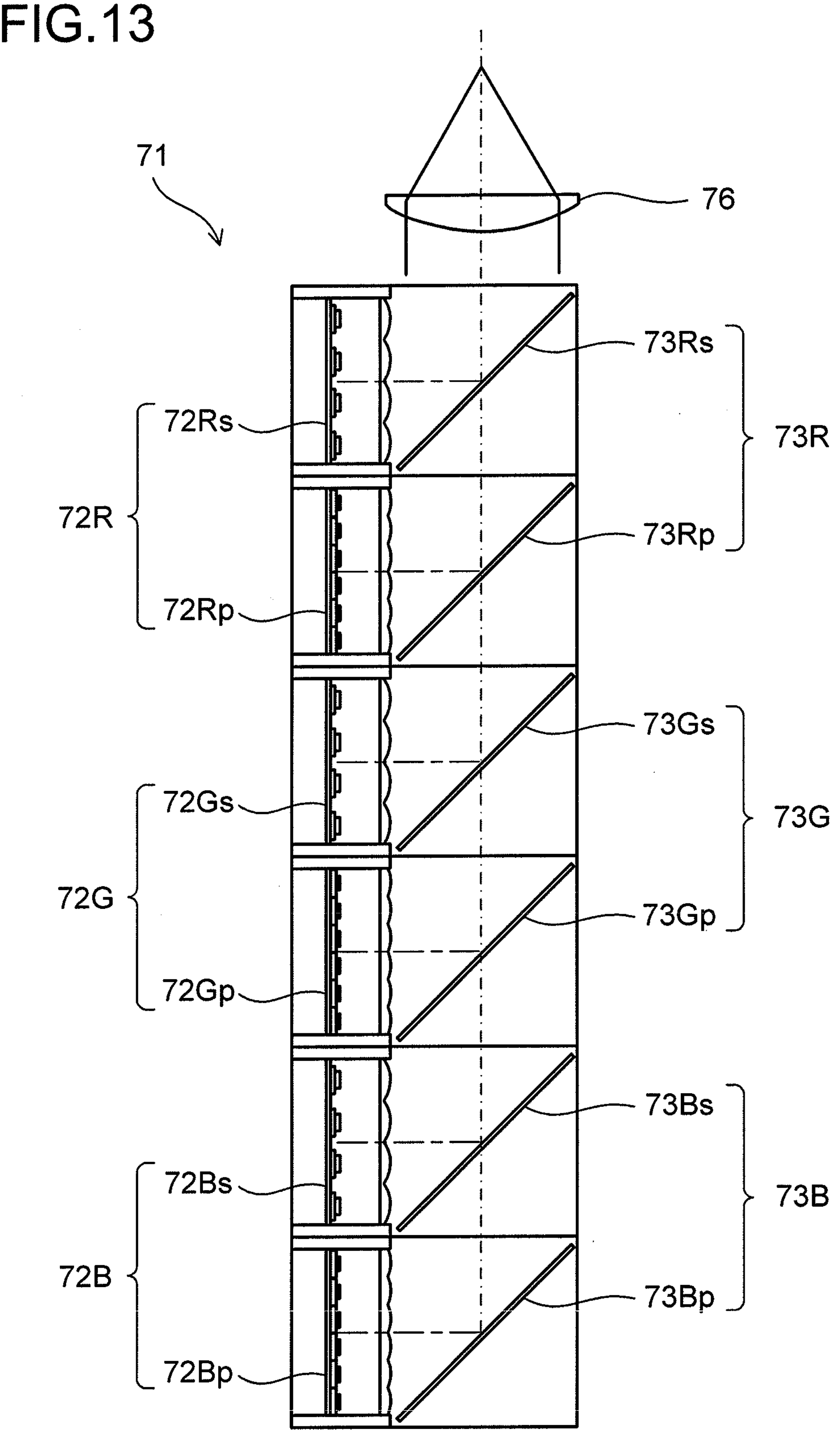
[FIG. 13] A sectional view showing the configuration of a light source of the image projection apparatus according to the second embodiment.
Figure 14:
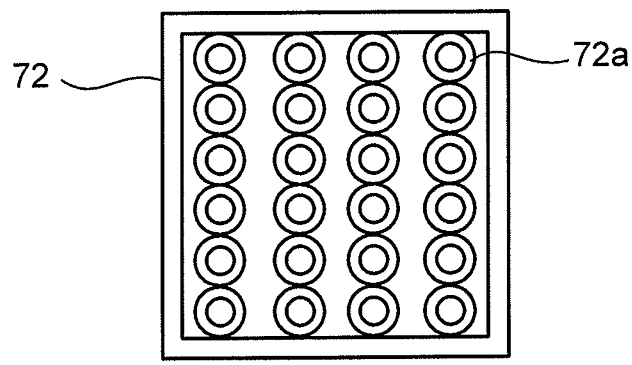
[FIG. 14] A plan view showing a laser array of the light source.
Figure 15:
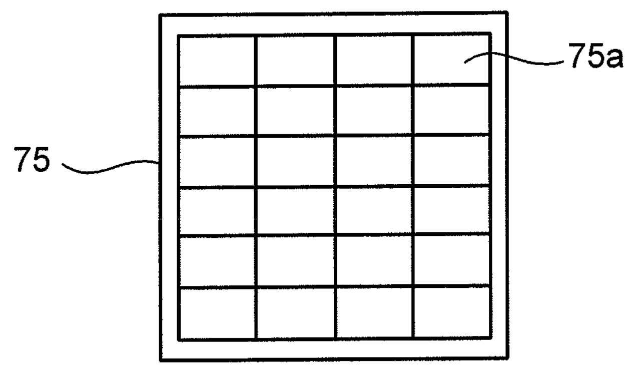
[FIG. 15] A plan view showing a collimation lens array of the light source.
Figure 16:
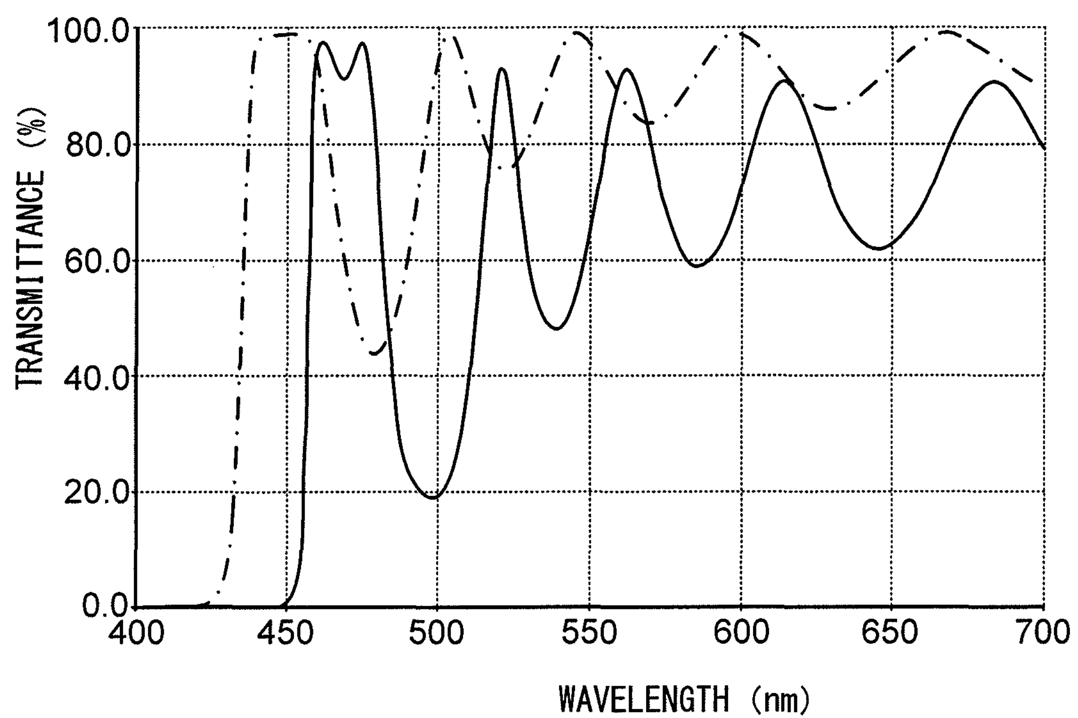
[FIG. 16] A diagram showing the reflection characteristic of a blue-band PBS mirror of the light source.
Figure 17:
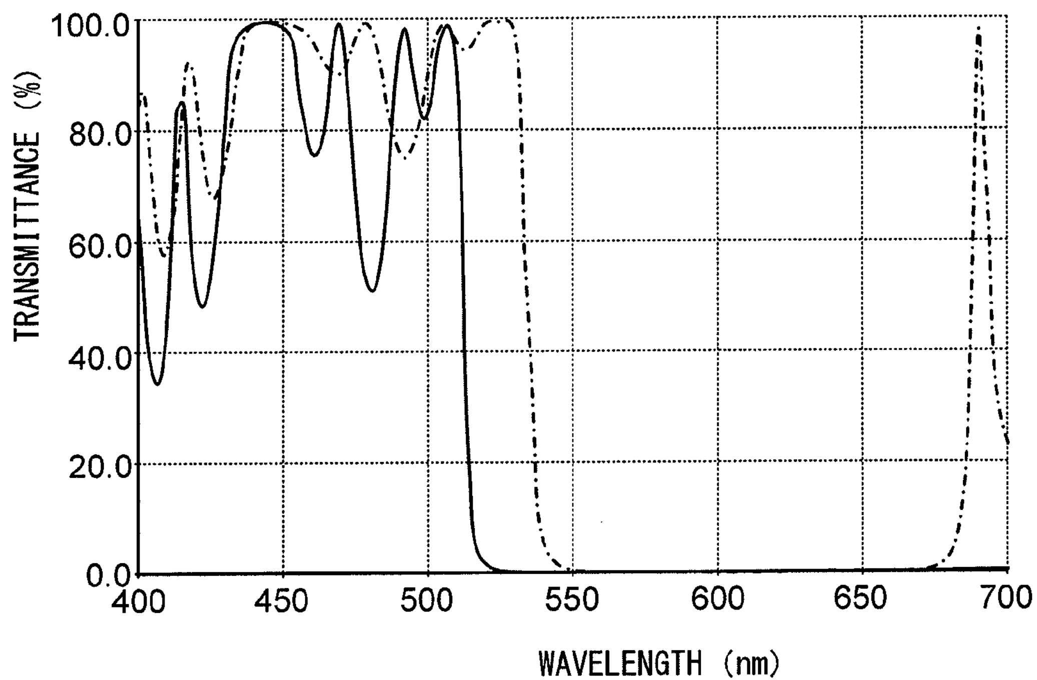
[FIG. 17] A diagram showing the reflection characteristic of a green-band PBS mirror of the light source.
Figure 18:
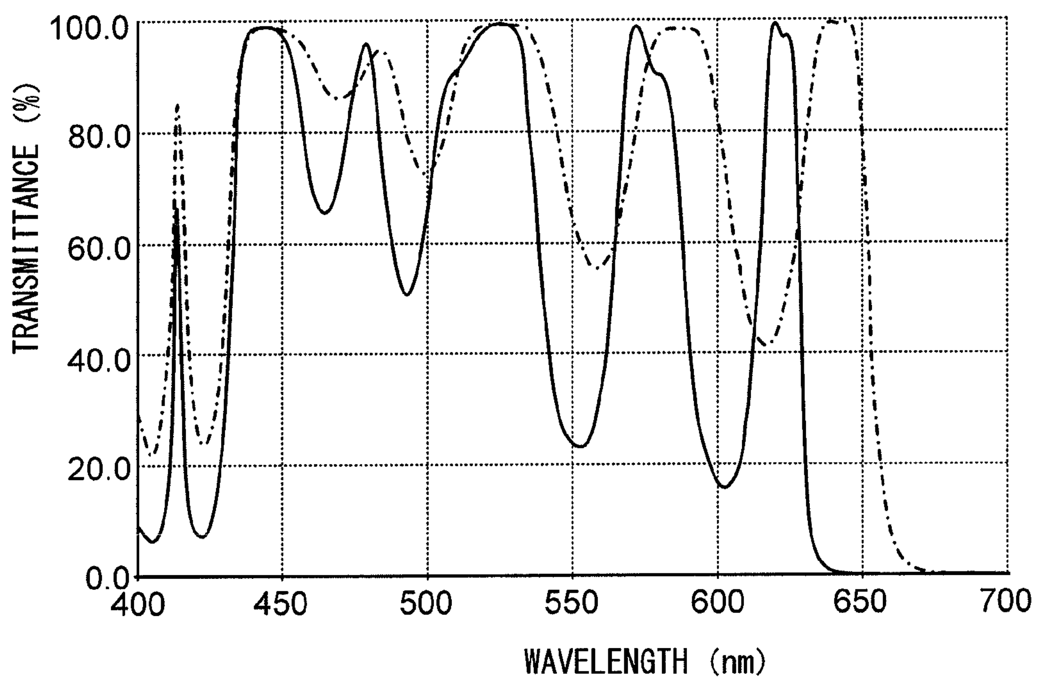
[FIG. 18] A diagram showing the reflection characteristic of a red-band PBS mirror of the light source.

The first and second embodiments deal with configurations using a discharge lamp as the light source 1, but this is not meant to limit the present invention, and laser light may be used in the light source 1. FIGS. 13 to 18 are diagrams of a light source using laser light. FIG. 13 is a sectional view showing a laser light source unit, FIG. 14 is a plan view showing a laser array of the laser light source unit, FIG. 15 is a plan view showing a collimation lens array of the laser light source unit, FIG. 16 is a diagram showing the light-transmission characteristic of a blue-band PBS mirror of the laser light source unit, FIG. 17 is a diagram showing the light-transmission characteristic of a green-band PBS mirror of the laser light source unit, and FIG. 18 is a diagram showing the light-transmission characteristic of a red-band PBS mirror of the laser light source unit. Incidentally, in FIGS. 16 to 18, the solid lines indicate the light-transmission characteristic with respect to S-polarized light, and the dashed-dotted lines indicate the light-transmission characteristic with respect to P-polarized light.

As shown in FIG. 13, a laser light source unit 71 includes a blue laser unit 72B, a green laser unit 72G, a red laser unit 72R, a blue mirror unit 73B, a green mirror unit 73G, a red mirror unit 73R, and a condenser lens 76.

The blue laser unit 72B is a semiconductor laser array having a wavelength 445 nm, and includes a P-polarized blue laser array 72Bp which emits P-polarized laser light and an S-polarized blue laser array 72Bs which emits S-polarized laser light which is polarized in a direction perpendicular to the P-polarized light. In each of the P-polarized blue laser array 72Bp and the S-polarized blue laser array 72Bs, as shown in FIG. 14, a plurality of laser light sources 72*a* are arranged in rows and columns. The laser light sources 72*a* are arranged at a larger pitch in rows than in columns, such that a direction in which the radiation angle of a light flux from the laser light sources 72*a* is large corresponds to the larger array pitch. Also, as shown in FIG. 15, a plurality of collimation lenses 75*a* are provided facing the laser light sources 72*a*, and the collimation lenses 75*a* collimate the light flux from the laser light source 72*a* and output the resulting parallel light. A plurality of collimation lenses 75*a* are arranged in rows and columns to form the collimation lens array 75, which is formed in an opening shape corresponding to each of the P-polarized blue laser array 72Bp and the S-polarized blue laser array 72Bs. The P-polarized blue laser array 72Bp and the S-polarized blue laser array 72Bs may be the same laser arrays that irradiate the P-polarized laser light and the S-polarized laser light, respectively, by being disposed at positions different from each other by 90°, and likewise, the same collimation lens arrays may be used as the collimation lens arrays 75 by being disposed at positions different from each other by 90° according to the laser arrays.

The green laser unit 72G is a semiconductor laser array having a wavelength of 522 nm, and includes a P-polarized green laser array 72Gp which irradiates P-polarized laser light and an S-polarized green laser array 72Gs which irradiates S-polarized laser light which is polarized in a direction perpendicular to the P-polarized light. In each of the P-polarized green laser array 72Gp and the S-polarized green laser array 72Gs, as shown in FIG. 14, a plurality of laser light sources 72*a* are arranged in rows and columns. The laser light sources 72*a* are arranged at a larger pitch in rows than in columns, such that a direction in which the radiation angle of a light flux from the laser light sources 72*a* is large corresponds to the larger array pitch. Also, as shown in FIG. 15, a plurality of collimation lenses 75*a* are provided facing the laser light sources 72*a*, and the collimation lenses 75*a* collimate the light flux from the laser light source 72*a* and output the resulting parallel light. A plurality of collimation lenses 75*a* are arranged in rows and columns to form the collimation lens array 75, which is formed in an opening shape corresponding to each of the P-polarized blue laser array 72Gp and the S-polarized blue laser array 72Gs. The P-polarized blue laser array 72Gp and the S-polarized blue laser array 72Gs may be the same laser arrays that irradiate the P-polarized laser light and the S-polarized laser light, respectively by being disposed at positions different from each other by 90°, and likewise, the same collimation lens arrays may be used as the collimation lens arrays 75 by being disposed at positions different from each other by 90° according to the laser arrays.

The green laser unit 72R is a semiconductor laser array having a wavelength of 635 nm, and includes a P-polarized green laser array 72Rp which irradiates P-polarized laser light and an S-polarized green laser array 72Rs which irradiates S-polarized laser light which is polarized in a direction perpendicular to the P-polarized light. In each of the P-polarized green laser array 72Rp and the S-polarized green laser array 72Rs, as shown in FIG. 14, a plurality of laser light sources 72*a* are arranged in rows and columns. The laser light sources 72*a* are arranged at a larger pitch in rows than in columns, such that a direction in which the radiation angle of a light flux from the laser light sources 72*a* is large corresponds to the larger array pitch. Also, as shown in FIG. 15, a plurality of collimation lenses 75*a* are provided facing the laser light sources 72*a*, and the collimation lenses 75*a* collimate the light flux from the laser light source 72*a* and output the resulting parallel light. A plurality of collimation lenses 75*a* are arranged in rows and columns to form the collimation lens array 75, which is formed in an opening shape corresponding to each of the P-polarized blue laser array 72Rp and the S-polarized blue laser array 72Rs. The P-polarized blue laser array 72Rp and the S-polarized blue laser array 72Rs may be the same laser arrays that emit the P-polarized laser light and the S-polarized laser light, respectively by being disposed at positions different from each other by 90°, and likewise, the same collimation lens arrays may be used as the collimation lens arrays 75 by being disposed at positions different from each other by 90° according to the laser arrays.

The blue mirror unit 73B includes a reflection mirror 73Bp and a blue-band PBS mirror 73Bs. The blue-band PBS mirror 73Bs is provided with the light-transmitting characteristic shown in FIG. 16. P-polarized blue laser light emitted from the P-polarized blue laser array 72Bp is reflected on the reflection mirror 73Bp and passes through the blue-band PBS mirror 73Bs. S-polarized blue laser light emitted from the S-polarized blue laser array 72Bs is reflected on the blue-band PBS mirror 73Bs to be mixed with the P-polarized blue laser light into blue light.

The green mirror unit 73G includes a green-reflecting blue-transmitting mirror 73Gp and a green-band PBS blue-transmitting mirror 73Gs. The green-band PBS blue-transmitting mirror 73Gs is provided with the light-transmitting characteristic shown in FIG. 17. P-polarized green laser light emitted from the P-polarized green laser array 72Gp is reflected on the green-reflecting blue-transmitting mirror 73Gp and passes through the green-band PBS blue-transmitting mirror 73Gs. S-polarized green laser light emitted from the S-polarized green laser array 72Gs is reflected on the green-band PBS blue-transmitting mirror 73Gs to be mixed with the P-polarized green laser light into green light. Further, the blue light passes through the green-reflecting blue-transmitting mirror 73Gp and the green-band PBS blue-transmitting mirror 73Gs, and the green light and the blue light is mixed into cyan light.

The red mirror unit 73R includes a red-reflecting blue/green-transmitting mirror 73Rp and a red-band PBS blue/green-transmitting mirror 73Rs. The red-band PBS blue/green-transmitting mirror 73Rs is provided with the light-transmitting characteristic shown in FIG. 18. P-polarized red laser light emitted from the P-polarized red laser array 72Rp is reflected on the red-reflecting blue/green-transmitting mirror 73Rp and passes through the red-band PBS blue/green-transmitting mirror 73Rs. S-polarized red laser light emitted from the S-polarized red laser array 72Gs is reflected on the red-band PBS blue/green-transmitting mirror 73Rs to be mixed with the P-polarized red laser light into red light. Further, the cyan light passes through the green-reflecting blue-transmitting mirror 73Gp the red-reflecting blue/green-transmitting mirror 73Rp and the red-band PBS blue/green-transmitting mirror 73Rs, and the red light and the cyan light is mixed into white light.

The white light resulting from the mixing is condensed by the condense lens 76, and enters the rod integrators 22 and 52 (see FIGS. 1 and 2).

With this configuration of the laser light source unit 71, light transmitted from the plurality of laser light sources is mixed, and this helps reduce occurrence of speckle noise of laser light and achieve high brightness. Also, even if one or more of the plurality of laser light sources fails to emit light, it little affects the brightness of the laser light source unit 71 to change it, and thus does not make the laser light sources unsuitable for use as the laser light source unit 71. Also, even if the laser light sources do not have a uniform wavelength, since the blue, green, and red light is mixed with the light fluxes from the plurality of laser light sources, the light of each color has an averaged wavelength and does not greatly differ from each other in chromaticity, and this contributes to reduced non-uniformity in color reproducibility in the laser light source unit 71. Also, the color mixing and the polarization mixing are performed by the blue mirror unit 73B, the green mirror unit 73G, and the red mirror unit 73R, and the apparent number of the light sources is 1/6, and thus it is possible to obtain a highly-bright light source without enlarging the NA of an optical system. Also, since the collimation lenses are used to collimate the light fluxes emitted from the laser light sources, and the resulting parallel light is guided to be incident on the blue mirror unit 73B, the green mirror unit 73G, and the red mirror unit 73R, the distribution range of the incidence angles is small, and the color mixing and the polarization mixing are performed efficiently.

In the image projection apparatus including a light source using laser light, the DMDs 4 and 44 of Examples 6 to 10 (Tables 6 to 10) and the DMDs 44 of Examples 11 to 14 (Tables 11 to 14) can be used. In the tables, λ denotes the wavelength of the color of light that illuminates the display device (DMD 4, DMD 44) (unit: nm), d denotes the pixel pitch of the display device (DMD4, DMD 44) (unit: μm), θ denotes the tilt angle of a mirror (unit: degree), α denotes the incidence angle of the illumination light beam L (unit: °), γ denotes the angle of the specular reflection direction R (unit: °), β denotes the diffraction angle (unit: °), and k denotes a positive integer. The diffraction angle β is given a positive value in the clockwise direction from the normal line Ax of the image display surface, and a negative value in the counter-clockwise direction from the normal line Ax of the image display surface. "Light Amount of 2kth-order diffracted light beam (unit: %)" indicates the ratio of the light amount of a 2kth-order diffracted light beam to the light amount of the illumination light beam L.

TABLE 6

| λ | d | θ | α | γ | β 2k + 1 | β 2k | β 2k − 1 | Light amount of 2kth-order diffracted light beam | 2k |
|---|---|---|---|---|---|---|---|---|---|
| 445 nm | 10.8 μm | 12° | 24° | 0° | −1.74° | −0.07° | 1.60° | 99.7% | 14 |
| 532 nm | 10.8 μm | 12° | 24° | 0° | −2.64° | −0.64° | 1.35° | 84.1% | 12 |
| 635 nm | 10.8 μm | 12° | 24° | 0° | −2.90° | −0.52° | 1.87° | 92.5% | 10 |

In this example, the blue laser light source (wavelength: 445 nm) and the red laser light source (wavelength: 635 nm) each use laser light of a direct emission wavelength and of highly frequent use, and the green laser light source (wavelength: 532 nm) uses laser light of a second higher harmonic wavelength and of highly frequent use; thus an in expensive laser light source unit of high output can be obtained.

TABLE 7

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 445 nm | 10.8 μm | 12° | 24° | 0° | −1.74° | −0.07° | 1.60° | 99.7% | 14 |
| 522 nm | 10.8 μm | 12° | 24° | 0° | −2.15° | −0.19° | 1.76° | 98.4% | 12 |
| 635 nm | 10.8 μm | 12° | 24° | 0° | −2.90° | −0.52° | 1.87° | 92.5% | 10 |

The blue laser light source (wavelength: 445 nm), the green laser light source (wavelength: 522 nm), and the red laser light source (wavelength: 635 nm) each use semiconductor laser light of a direct emission wavelength, and do not use a crystal that generates a second higher harmonic wavelength; thus mass-producible and inexpensive laser light source unit can be obtained.

TABLE 8

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 445 nm | 13.68 μm | 12° | 24° | 0° | −1.74° | −0.42° | 0.90° | 84.6% | 18 |
| 555 nm | 13.68 μm | 12° | 24° | 0° | −1.35° | 0.293° | 1.937° | 94.9% | 14 |
| 635 nm | 13.68 μm | 12° | 24° | 0° | −1.14° | 0.737° | 2.619° | 77.4% | 12 |

TABLE 9

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 445 nm | 7.56 μm | 12° | 24° | 0° | −2.93° | −0.54° | 1.84° | 91.8% | 10 |
| 532 nm | 7.56 μm | 12° | 24° | 0° | −2.36° | 0.50° | 3.35° | 95.1% | 8 |
| 671 nm | 7.56 μm | 12° | 24° | 0° | −1.87° | 1.73° | 5.33° | 67.9% | 6 |

TABLE 10

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 445 nm | 9.6 μm | 14° | 28° | 0° | −1.27° | 0.61° | 2.49° | 84.1% | 14 |
| 532 nm | 9.6 μm | 14° | 28° | 0° | −2.29° | −0.04° | 2.20° | 99.9% | 12 |
| 635 nm | 9.6 μm | 14° | 28° | 0° | −2.58° | 0.10° | 2.78° | 99.8% | 10 |

TABLE 11

| | | | | | β | | | Light amount of 2kth-order diffracted | |
|---|---|---|---|---|---|---|---|---|---|
| λ | d | θ | α | γ | 2k + 1 | 2k | 2k − 1 | light beam | 2k |
| 445 nm | 10.8 μm | 12° | 24° | 0° | −1.74° | −0.07° | 1.60° | 99.7% | 14 |
| 532 nm | 7.56 μm | 12° | 24° | 0° | −2.36° | 0.50° | 3.35° | 95.1% | 8 |
| 635 nm | 10.8 μm | 12° | 24° | 0° | −2.90° | −0.52° | 1.87° | 92.5% | 10 |

TABLE 12

| λ | d | θ | α | γ | β 2k + 1 | β 2k | β 2k − 1 | Light amount of 2kth-order diffracted light beam | 2k |
|---|---|---|---|---|---|---|---|---|---|
| 445 nm | 6.19 μm | 12° | 24° | 0° | −2.91° | 0.00° | 2.92° | 100.0% | 8 |
| 522 nm | 7.26 μm | 12° | 24° | 0° | −2.91° | 0.00° | 2.91° | 100.0% | 8 |
| 638 nm | 8.87 μm | 12° | 24° | 0° | −2.91° | 0.00° | 2.91° | 100.0% | 8 |

TABLE 13

| λ | d | θ | α | γ | β 2k + 1 | β 2k | β 2k − 1 | Light amount of 2kth-order diffracted light beam | 2k |
|---|---|---|---|---|---|---|---|---|---|
| 445 nm | 13.68 μm | 12° | 24° | 0° | −1.74° | −0.42° | 0.90° | 84.6% | 18 |
| 522 nm | 13.68 μm | 11.1° | 22.2° | 0° | −1.54° | 0.01° | 1.55° | 100.0% | 14 |
| 635 nm | 13.68 μm | 12° | 24° | 0° | −1.14° | 0.74° | 2.62° | 77.4% | 12 |

TABLE 14

| λ | d | θ | α | γ | β 2k + 1 | β 2k | β 2k − 1 | Light amount of 2kth-order diffracted light beam | 2k |
|---|---|---|---|---|---|---|---|---|---|
| 465 nm | 7.56 μm | 10.2° | 20.4° | 0° | −2.46° | 0.04° | 2.53° | 100.0% | 8 |
| 532 nm | 7.56 μm | 12° | 24° | 0° | −2.81° | 0.04° | 2.89° | 100.0% | 8 |
| 638 nm | 7.56 μm | 10.5° | 21° | 0° | −3.40° | 0.02° | 3.44° | 100.0% | 6 |

Examples 6 to 14 described above satisfy the conditional expression (1). Further, in Example 11, the pixel pitch d of the DMD 44G is set different from those of the DMDs 44B and 44R. Also, in Example 12, the pixel pitches d of the DMDs 44R, 44G, and 44B are set different from one another. In this way, by setting one of the pixel pitches d of the DMD 44 different from the other pixel pitches d of the DMD 44, the even-order diffracted light beams D are made to appear closer to the reflection axis R, and reduction of the light amount of the diffracted light beams D from the light amount of the illumination light L is minimized.

Also, in Example 13, the tilt angle θ of the DMD 44G is set different from those of the DMDs 44B and 44R. In Example 14, the tilt angles θ of the DMDs 44R, 44G, and 44B are set different from one another. In this way, by setting one of the pixel pitches d of the DMDs 44R, 44G, and 44B different from the pixel pitches d of the others of the DMDs 44R, 44G, and 44B, the even-order diffracted light beams D are made to appear closer to the reflection axis R, and reduction of the light amount of the diffracted light beams D from the light amount of the illumination light L is minimized.

Also, in Examples 6, 7, and 10, the integer is set to seven in the case of blue image display, six in the case of green image display, and five in the case of red image display. With these settings, the even-order diffracted light beam D located in the vicinity of the specular reflection direction R is the 14th-order diffracted light beam in the DMD 44B, the 12th-order diffracted light beam in the DMD 44G, and the 10th-order diffraction light beam in the DMD 44R. This makes it possible to use an existing inexpensive laser light source that is excellent in light emitting efficiency and mass-producibility, with light of colors of the wavelengths of the laser light source, to achieve an efficient optical system in the DMD 44 of the same pixel pitch d and the same mirror tilt angle θ. Thus, by using laser light generated by diffracted light beams of these diffraction orders as the light source, a bright (highly bright) inexpensive image projection apparatus can be obtained.

Also, if Examples 6 to 10, where the DMDs of the three colors have the same pixel pitch d, the same tilt angle θ, and the same incidence angle α, are applied to the first embodiment provided with the DMDs 44R, 44G, and 44B, illumination optical systems do not have to different configurations for different colors, and this makes it possible to provide an inexpensive image projection apparatus. It is also possible to apply Examples 6 to 10 to the second embodiment where the display device is formed with one DMD 4, and in this case, it is possible to provide an inexpensive compact image projection apparatus.

The present invention is applicable to an image projection apparatus that projects an image formed on a display device onto a screen, and in particular, the present invention is applicable to an image projection apparatus provided with a display device formed with a digital micromirror device that displays an image by rotating mirrors functioning as pixels.

What is claimed is:

1. An image projection apparatus, comprising:

a light source formed with a discharge lamp;

a display device which displays blue, green, and red images by modulating illumination light from the light source at pixels; and a projection lens which projects the blue, green, and red images which are displayed at the display device, wherein the display device is formed with a digital micromirror device which reflects the illumination light with mirrors functioning as the pixels such that, as ON-light, light representing the image is directed to the projection lens, and, as OFF-light, light not representing the image is directed to an outside of the projection lens; and the following conditional expression is satisfied:

$$\beta_{(2\cdot k-1)} \geq 2\cdot\gamma - \beta_{(2\cdot k)} \geq \beta_{(2\cdot k+1)},$$

where $\beta_{(m)}$ denotes a diffraction angle of an mth-order diffracted light beam resulting from diffraction that occurs when the illumination light is incident on an image display surface of the display device, $\beta_{(m)}$ satisfying the following equation:

$$\beta_{(m)} = \sin^{-1}\{\sin\alpha - m\cdot\lambda/\sqrt{2}\cdot d)\};$$

$\gamma$ denotes an angle that is, when a beam of the illumination light incident on the display device is specularly reflected by the mirrors of the display device which output the ON-light, formed between a direction in which the specularly reflected beam of the illumination light is outputted and a normal line of the image display surface, $\gamma$ satisfying the following equation: $\gamma=\alpha-2\cdot\theta$;

d denotes a pixel pitch of the display device;

$\alpha$ denotes an incidence angle of a beam of the illumination light incident on the display device with respect to the normal line of the image display surface;

$\theta$ denotes a tilt angle of a normal line of the mirrors of the display device which output the ON-light with respect to the normal line of the image display surface;

$\lambda$ denotes a wavelength, the wavelength being 480 nm in a case of blue image display, 550 nm in a case of green image display, and 620 nm in a case of red image display;

m denotes a positive integer; and k denotes a negative integer.

2. The image projection apparatus of claim 1, wherein three display devices are provided corresponding to colors of blue, green, and red as the display device; and one of the three display devices is different in pixel pitch d from other display devices.

3. The image projection apparatus of claim 1, wherein three display devices are provided corresponding to colors of blue, green, and red as the display device; and one of the three display devices is different in tilt angle $\theta$ from other display devices.

4. An image projection apparatus, comprising:

a laser light source which emits blue, green, and red laser light;

a display device which displays blue, green, and red images by modulating illumination light from the laser light source at pixels; and a projection lens which projects the blue, green, and red images which are displayed at the display device, wherein the display device is formed with a digital micromirror device which reflects the illumination light with mirrors functioning as the pixels such that, as ON-light, light representing the image is directed to the projection lens, and, as OFF-light, light not representing the image is directed to an outside of the projection lens; and the following conditional expression is satisfied:

$$\beta_{(2\cdot k-1)} \geq 2\cdot\gamma - \beta_{(2\cdot k)} \geq \beta_{(2\cdot k+1)},$$

where $\beta_{(m)}$ denotes a diffraction angle of an mth-order diffracted light beam resulting from diffraction that occurs when the illumination light is incident on an image display surface of the display device, $\beta_{(m)}$ satisfying the following equation:

$$\beta_{(m)} = \sin^{-1}\{\sin\alpha - m\cdot\lambda(\sqrt{2}\cdot d)\};$$

$\gamma$ denotes an angle that is, when a beam of the illumination light incident on the display device is specularly reflected by the mirrors of the display device which output the ON-light, formed between a direction in which the specularly reflected beam of the illumination light is outputted and a normal line of the image display surface, $\gamma$ satisfying the following equation: $\gamma=\alpha-2\cdot\theta$;

d denotes a pixel pitch of the display device;

$\alpha$ denotes an incidence angle of a beam of the illumination light incident on the display device with respect to the normal line of the image display surface;

$\theta$ denotes a tilt angle of a normal line of the mirrors of the display device which output the ON-light with respect to the normal line of the image display surface;

$\lambda$ denotes a wavelength, the wavelength being a wavelength of blue laser light emitted from the laser light source in a case of blue image display, a wavelength of green laser light emitted from the laser light source in a case of green image display, and a wavelength of red laser light emitted from the laser light source in a case of red image display;

m denotes a positive integer; and k denotes a negative integer.

5. The image projection apparatus of claim 4, wherein k is 7 in the case of blue image display, k is 6 in the case of green image display, and k is 5 in the case of red image display.

6. The image projection apparatus of claim 4, wherein three display devices are provided corresponding to colors of blue, green, and red as the display device; and one of the three display devices is different in pixel pitch d from other display devices.

7. The image projection apparatus of claim 4, wherein three display devices are provided corresponding to colors of blue, green, and red as the display device; and one of the three display devices is different in tilt angle $\theta$ from other display devices.

* * * * *